US012792693B1

(12) United States Patent
Mogill

(10) Patent No.: US 12,792,693 B1
(45) Date of Patent: Nov. 10, 2026

(54) SYSTEMS FOR AND METHODS OF MULTI-MODAL INTAKE PROCESSING AND ADAPTIVE CLASSIFICATION

(71) Applicant: Crisp, Inc., Atlanta, GA (US)

(72) Inventor: Michael Mogill, Atlanta, GA (US)

(73) Assignee: Crisp, Inc., Atlanta, GA (US)

( * ) Notice: Subject to any disclaimer, the term of this patent is extended or adjusted under 35 U.S.C. 154(b) by 0 days.

(21) Appl. No.: 19/419,967

(22) Filed: Dec. 15, 2025

(51) Int. Cl.

| | |
|---|---|
| ***G10L 15/16*** | (2006.01) |
| ***G06F 18/2415*** | (2023.01) |
| ***G06F 21/60*** | (2013.01) |
| ***G10L 15/26*** | (2006.01) |
| *G06F 40/284* | (2020.01) |
| *G06F 40/30* | (2020.01) |
| *G06F 40/40* | (2020.01) |
| *G10L 15/06* | (2013.01) |

(52) U.S. Cl.
CPC ........ *G06F 18/2415* (2023.01); *G06F 21/602* (2013.01); *G10L 15/26* (2013.01); *G06F 40/284* (2020.01); *G06F 40/30* (2020.01); *G06F 40/40* (2020.01); *G10L 15/063* (2013.01); *G10L 15/16* (2013.01)

(58) Field of Classification Search
CPC .. G06F 18/2415; G06F 21/602; G06F 40/284; G06F 40/40; G06F 40/30; G10L 15/26; G10L 15/063; G10L 15/16
USPC .......................................................... 707/738
See application file for complete search history.

(56) References Cited

U.S. PATENT DOCUMENTS 6,983,288 B1 * 1/2006 Kirkwood ............. G06F 16/289
9,805,276 B2 * 10/2017 Pillai ..................... B60W 40/08
10,282,467 B2 * 5/2019 Gou ...................... G06F 16/335
10,467,344 B1 * 11/2019 Jade ...................... G06F 40/205
10,726,207 B2 * 7/2020 He .......................... G06F 40/30
11,017,177 B2 * 5/2021 Kumar ..................... G06N 3/08
11,062,094 B2 * 7/2021 Kieser ..................... G06F 17/18
11,450,124 B1 * 9/2022 Zhang ................... G06F 40/237
11,531,998 B2 * 12/2022 Kopikare ................ G06F 40/30
11,748,573 B2 * 9/2023 Gunturi ................ G06N 3/0464 704/9
11,775,607 B2 * 10/2023 Denninghoff ....... G06F 16/9538 707/722

(Continued)

FOREIGN PATENT DOCUMENTS

IN 202341027096 A 5/2023
IN 202521007370 A 2/2025

(Continued)

*Primary Examiner* — Hanh B Thai
(74) *Attorney, Agent, or Firm* — CALDWELL LLC

(57) ABSTRACT

A system including at least a processor configured to receive at least one input data stream from a plurality of input data streams, generate an inquiry object by mapping one or more instances of the at least one input data stream to a predefined data schema, and classify, using a classification layer, the inquiry object to at least a taxonomy node of a plurality of taxonomy nodes. The processor is further configured to generate, as a function of classifying the inquiry object to the at least a taxonomy node of the plurality of taxonomy nodes, a confidence score appended to the inquiry object as an instance, and filter, using a filtering layer, an accumulated set of inquiry objects as a function of the confidence score and a predefined rule set associated with the at least a taxonomy node of the plurality of taxonomy nodes.

18 Claims, 7 Drawing Sheets

(56) References Cited

U.S. PATENT DOCUMENTS

| | | | | |
|---|---|---|---|---|
| 12,013,850 | B2 * | 6/2024 | Rahmfeld | G06F 16/213 |
| 12,511,303 | B1 * | 12/2025 | Boothby | G06F 16/2477 |
| 12,639,292 | B1 * | 5/2026 | Aggarwal | G06F 16/2425 |
| 2003/0115191 | A1 * | 6/2003 | Copperman | G06F 16/90332 707/E17.139 |
| 2003/0182282 | A1 * | 9/2003 | Ripley | G06F 16/2468 707/999.005 |
| 2003/0220917 | A1 * | 11/2003 | Copperman | G06F 16/3322 |
| 2006/0173868 | A1 * | 8/2006 | Angele | G06F 16/84 |
| 2010/0306249 | A1 * | 12/2010 | Hill | G06Q 10/40 707/769 |
| 2015/0363171 | A1 * | 12/2015 | Esfahany | G06F 40/205 717/106 |
| 2016/0314127 | A1 * | 10/2016 | Har-Noy | G06Q 10/101 |
| 2017/0257425 | A1 * | 9/2017 | Narsude | G06F 11/1402 |
| 2019/0163733 | A1 * | 5/2019 | Dua | G06V 30/416 |
| 2019/0286734 | A1 * | 9/2019 | Kao | G06F 16/2237 |
| 2021/0216721 | A1 * | 7/2021 | Gunturi | G06F 16/345 |
| 2021/0397971 | A1 * | 12/2021 | Pardeshi | G06N 3/047 |
| 2022/0012749 | A1 | 1/2022 | Apfelbaum et al. | |
| 2022/0101057 | A1 * | 3/2022 | Goodsitt | G06V 10/764 |
| 2022/0277197 | A1 * | 9/2022 | Malon | G06N 3/09 |
| 2023/0110659 | A1 * | 4/2023 | Dong | G06F 16/211 707/737 |
| 2024/0104932 | A1 * | 3/2024 | Kirigan | G06V 20/56 |
| 2025/0173757 | A1 * | 5/2025 | Granville | H04L 67/53 |
| 2025/0252343 | A1 * | 8/2025 | Wickramarachchige Don | G06N 20/00 |
| 2025/0253016 | A1 * | 8/2025 | Hafen | G06F 16/248 |
| 2025/0285467 | A1 * | 9/2025 | Tripathi | G06T 3/18 |
| 2025/0342398 | A1 * | 11/2025 | Li | G06N 20/00 |
| 2025/0356725 | A1 * | 11/2025 | Nowak | G07F 17/3225 |
| 2025/0358128 | A1 * | 11/2025 | Zertuche | H04L 9/3236 |
| 2026/0004030 | A1 * | 1/2026 | Roper, Jr. | G06F 8/36 |
| 2026/0037537 | A1 * | 2/2026 | Dhenia | G06F 16/258 |

FOREIGN PATENT DOCUMENTS

| | | | |
|---|---|---|---|
| IN | 202531010180 | A | 2/2025 |
| KR | 20240138609 | A | 9/2024 |

* cited by examiner

SYSTEMS FOR AND METHODS OF MULTI-MODAL INTAKE PROCESSING AND ADAPTIVE CLASSIFICATION

FIELD OF THE INVENTION

The present invention generally relates to the field of artificial intelligence and data analytics systems. In particular, the present invention is directed to systems for and methods of multi-modal intake processing and adaptive classification.

BACKGROUND

Conventional data intake systems often rely on rigid rule-based workflows that process user submissions or client inquiries as isolated data entries. These systems struggle to accommodate heterogeneous input formats, such as audio recordings, emails, and web forms, and lack mechanisms to reconcile overlapping or fragmented information originating from multiple sources. As a result, classification accuracy is frequently degraded by inconsistent data normalization and incomplete context, leading to redundant review and inefficient downstream routing. Existing machine-learning models, when applied in this setting, typically operate on static datasets and fail to adapt to evolving data patterns or outcome variability. Accordingly, there remains a need for improved systems capable of handling multi-modal input data and maintaining coherence, accuracy, and adaptability throughout the intake process.

SUMMARY OF THE DISCLOSURE

In some aspects, the techniques described herein relate to a system for multi-modal intake processing and adaptive classification, the system including: at least a processor and a memory communicatively connected to the at least a processor, wherein the memory contains instructions configuring the at least a processor to: receive at least one input data stream from a plurality of input data streams, generate, as a function of the at least one input data stream, an inquiry object, wherein generating the inquiry object includes mapping one or more instances of the at least one input data stream to a predefined data schema, classify, using a classification layer, the inquiry object to at least a taxonomy node of a plurality of taxonomy nodes, generate, as a function of classifying the inquiry object to the at least a taxonomy node of the plurality of taxonomy nodes, a confidence score, wherein the confidence score is appended to the inquiry object as an instance, and filter, using a filtering layer, an accumulated set of inquiry objects as a function of the confidence score and a predefined rule set associated with the at least a taxonomy node of the plurality of taxonomy nodes.

In some aspects, the techniques described herein relate to a method of multi-modal intake processing and adaptive classification, the method including: receiving, by at least a processor, at least one input data stream from a plurality of input data streams, generating, using the at least a processor and as a function of the at least one input data stream, an inquiry object, wherein generating the inquiry object includes mapping one or more instances of the at least one input data stream to a predefined data schema, classifying, using a classification layer, the inquiry object to at least a taxonomy node of a plurality of taxonomy nodes, generating, using the at least a processor and as a function of classifying the inquiry object to the at least a taxonomy node of the plurality of taxonomy nodes, a confidence score, wherein the confidence score is appended to the inquiry object as an instance, and filtering, using a filtering layer, an accumulated set of inquiry objects as a function of the confidence score and a predefined rule set associated with the at least a taxonomy node of the plurality of taxonomy nodes.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
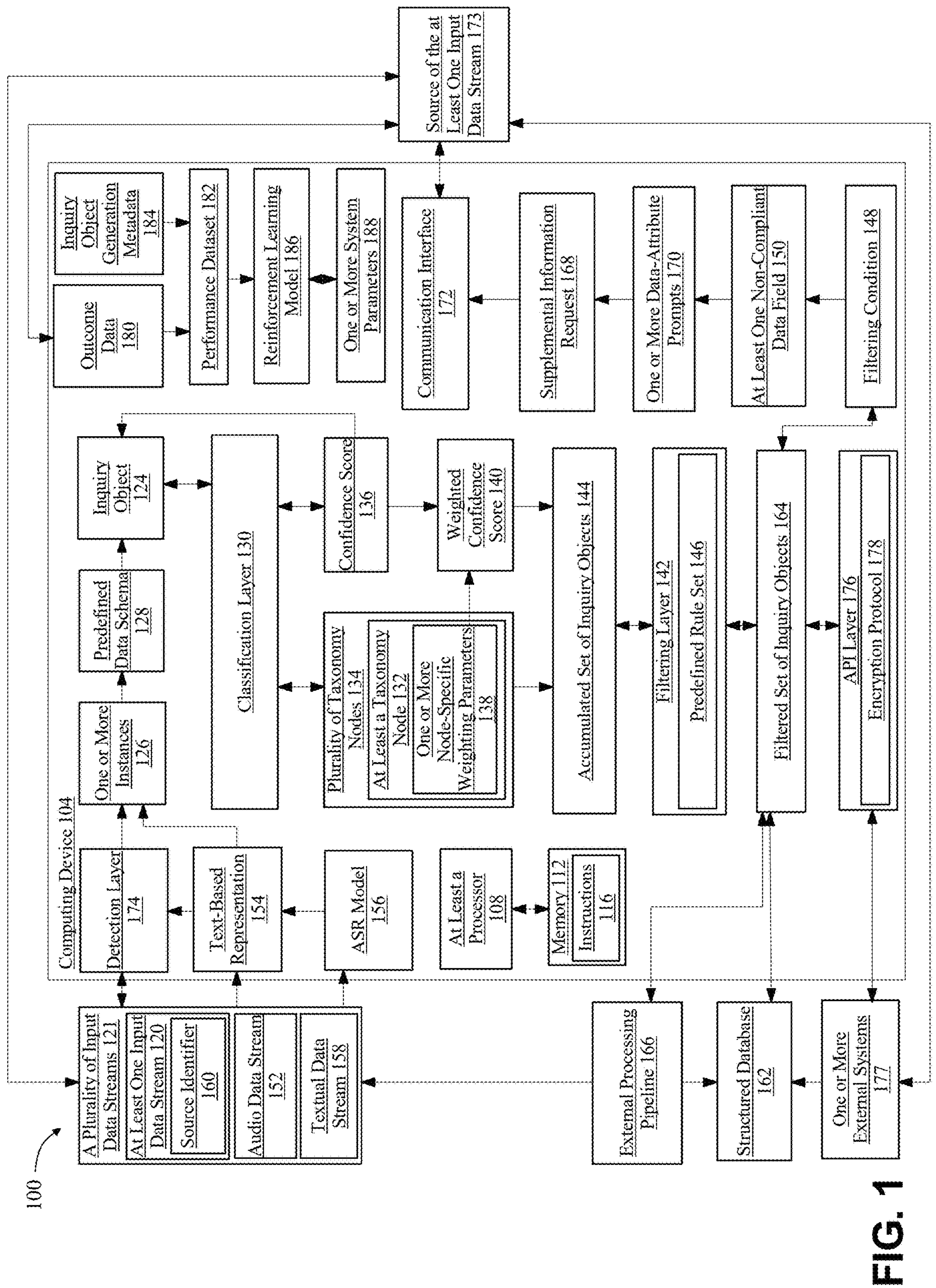
FIG. 1 is block diagram of an exemplary system for multi-modal intake processing and adaptive classification.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Embodiments of the technology disclosed herein relate to an artificial-intelligence-driven intake architecture that automates the capture, interpretation, and qualification of incoming client inquiries for legal practices. In some embodiments, data originating from audio recordings, emails, and web submissions are transformed into a unified structured format encompassing fields such as client demographics, legal category, urgency level, and jurisdictional information. In some embodiments, a layered natural-language-understanding pipeline processes each submission and associates it with a defined node case taxonomy, while rule-based filtering logic excludes ineligible or low-quality entries. In some embodiments, the platform interfaces securely with existing case-management and customer-relationship-management systems through authenticated API connections. In some embodiments, a feedback component correlates intake performance with eventual case outcomes and employs reinforcement learning to recalibrate classification parameters, thereby yielding a continuously improving model that enhances screening precision and minimizes administrative overhead.

At a high level, aspects of the present disclosure are directed to systems and methods for multi-modal intake processing and adaptive classification of heterogeneous input data streams using machine learning. In an embodiment, the system receives audio, text-based, and structured electronic inputs, normalizes them into a unified data schema, and processes the resulting inquiry objects through a classification and filtering pipeline configured to maintain contextual coherence and accuracy across multiple data sources.

Aspects of the present disclosure can be used to improve the accuracy, efficiency, and adaptability of automated intake workflows operating across diverse digital channels. Aspects of the present disclosure can also be used to facilitate intelligent synchronization and feedback-driven refinement between intake systems and downstream case-management or analytical platforms. This is so, at least in part, because the disclosed system employs layered model architectures, including classification, filtering, and detection layers, that process incoming data streams in real time while dynamically recalibrating classification parameters based on outcome data and reinforcement-learning feedback.

Aspects of the present disclosure allow for self-optimizing intake models that can continuously learn from case resolution outcomes, reconcile related data streams into unified inquiry objects, and securely route prioritized outputs to external systems through authenticated interfaces. Exemplary embodiments illustrating aspects of the present disclosure are described below in the context of several specific examples.

Embodiments of the disclosed system and method provide a machine-implemented framework that transforms unstructured, multi-modal inquiry data into a unified, continuously learning intake pipeline. In some embodiments, by combining layered natural-language-understanding models with structured schema mapping, the system enables automated parsing and contextual classification of audio, email, and web-based submissions without requiring manual data entry or rule-based scripting. In some embodiments, integrated filtering and weighting mechanisms ensure that each inquiry is dynamically evaluated against node-specific parameters, improving alignment between data quality and downstream routing. In some embodiments, through authenticated API synchronization and reinforcement-learning feedback, the system maintains real-time interoperability with external case-management platforms while adapting its classification behavior based on historical outcome data. Advantageously, this architecture allows intake accuracy, consistency, and responsiveness to evolve automatically as new information becomes available.

In one or more embodiments, the present disclosure provides a technical improvement in the automation and accuracy of client-intake workflows by enabling the system to normalize and classify heterogeneous input data streams across multiple modalities. This addresses inefficiencies in conventional intake systems that rely on manual triage, single-channel data entry, or static decision trees. The disclosed multi-layer architecture, including classification, filtering, and detection layers, further improves computational efficiency and processing accuracy by distributing analytic functions across specialized modules that operate concurrently. In an embodiment, through the incorporation of reinforcement-learning feedback, the system may continuously recalibrate classification thresholds and node-weighting parameters based on verified outcomes, mitigating model drift and maintaining predictive stability over time. By correlating outcome data with prior intake decisions to generate a dynamic performance dataset, the disclosed embodiments may enable a self-optimizing model that adapts autonomously to new data distributions without human intervention. Additionally, secure synchronization through authenticated API layers and encryption protocols may enhance interoperability with external case-management and analytical systems while ensuring data confidentiality and integrity. Collectively, these embodiments provide measurable improvements in intake accuracy, responsiveness, and operational scalability. Other technical improvements are provided throughout this disclosure and will be readily recognized by one of ordinary skill in the art.

Referring now to FIG. 1, an exemplary embodiment of system 100 for multi-modal intake processing and adaptive classification is illustrated. System 100 may include circuitry such as without limitation at least a processor 108 communicatively connected to a memory 112 containing instructions 116 configuring at least a processor 108 to initiate one or more tasks as described throughout this disclosure; for instance, circuitry may include and/or be included in a computing device. As used in this disclosure, "communicatively connected" means connected by way of a connection, attachment, or linkage between two or more relata such as without limitation electronic components, modules, and/or devices which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Circuitry may alternatively or additionally be implemented by configuring a hardware device such as a combinatorial or sequential logic circuit, an application-specific integrated circuit (ASIC), a field-programmable gate array (FPGA), or other hardware unit; memory may be attached thereto to further configure the hardware unit using read-only memory (ROM) or any other static or writable memory as described in this disclosure. Alternatively or additionally, hardware units and/or modules may be combined with and/or in communication with a processor, such as without limitation in a system-on-chip architecture wherein some functions are configured by modification or design of hardware circuitry, such as without limitation FPGA circuitry, while others are configured in the form of instructions in memory for one or more processors. As a non-limiting example, any step or combination of steps described herein may be performed entirely using hardware circuit configured to perform such steps either with static memory or rewritable memory. Such steps or combinations of steps may include signing with a digital signature, cryptographically hashing, evaluation of zero-knowledge proofs, or any other specific process described in this disclosure.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

In continued reference to FIG. 1, in an embodiment, at least a processor 108 may be configured to receive at least one input data stream 120 from a plurality of input data streams 121. For purposes of this disclosure, an "input data stream" is a continuous or discrete flow of digital information received from one or more sources and containing at least one payload of user-supplied or system-generated data. In an embodiment, the plurality of input data streams 121 may include, without limitation, audio data, textual data, structured digital submissions, or combinations thereof. Each input data stream may be generated from an independent communication channel such as a web form, an email interface, a voice-recording system, and/or an external database. In some embodiments, at least a processor 108 may be configured to monitor, capture, and store the input data streams as they are received, while performing protocol normalization to ensure compatibility across varying transmission formats. In an embodiment, system 100 may also temporarily buffer or queue incoming streams to maintain sequence integrity, allowing asynchronous or partially received inputs to be properly aligned with other related data prior to further processing.

In further reference to FIG. 1, in an embodiment, where the at least one input data stream 120 includes an audio data stream 152 generating the inquiry object 124 may include converting the audio data stream 152 into a text-based representation 154 using an automatic speech-recognition (ASR) model 156. For purposes of this disclosure, an "audio data stream" is a digital signal comprising temporally ordered sound samples that encode spoken language or acoustic events captured by a microphone, telephony interface, or other voice-enabled input device. Non-limiting examples of audio data streams 152 may include recorded client intake calls, voice messages submitted through a web portal, and/or real-time conversations processed through a cloud telephony system. In an embodiment, audio data streams 152 may represent one of several possible input modalities from which client information can be extracted, and thus may function as raw, unstructured input sources for subsequent normalization and classification within the intake pipeline. For purposes of this disclosure, a "text-based representation" is a linguistic artifact derived from the transformation of speech data into textual form. Such a representation may include transcribed words, punctuation, and optional metadata such as timestamps, speaker identifiers, and/or transcription confidence values. In some embodiments, the text-based representation 154 may be structured in a tokenized format compatible with downstream natural-language-processing operations, such as part-of-speech tagging, named-entity recognition, and/or semantic embedding generation. For purposes of this disclosure, an "automatic speech-recognition (ASR) model" is a trained machine-learning model configured to convert acoustic features derived from the audio data stream 152 into corresponding language tokens or textual units. In an embodiment the ASR model 156 may include one or more neural network architectures, such as convolutional neural networks (CNNs) for feature extraction and transformer-based encoders for contextual mapping between phonemes and linguistic constructs. In certain embodiments, the ASR model 156 may include both an acoustic model that maps spectral features to phonetic elements and a language model that predicts word sequences based on statistical or learned context.

Still referring to FIG. 1, in an embodiment, the ASR model 156 may receive as input an audio data stream 152 either preprocessed to reduce noise and enhance signal quality and/or raw data. In an embodiment, preprocessing operations may include normalization of sampling rate, application of noise suppression filters, and/or segmentation of continuous speech into analysis windows. The ASR model 156 may convert these segments into acoustic feature vectors, such as Mel-frequency cepstral coefficients (MFCCs) or log-Mel spectrograms, which serve as low-dimensional representations of the speech waveform. These features may be provided to the ASR model's encoder component, which may output a sequence of latent representations capturing phonetic and temporal dependencies. In an embodiment, the output of the ASR model 156 may include transcribed text sequences, confidence scores 136 for each predicted token, and optional alignment metadata mapping audio frames to text segments. In some embodiments, this output may also include timestamps, speaker diarization tags, and/or contextual annotations used to associate the resulting text-based representation 154 with other input modalities during inquiry-object generation.

In further reference to FIG. 1, in an embodiment, the ASR model 156 may be trained using training data including paired audio samples and corresponding ground-truth text transcripts. Such data may be sourced from publicly available corpora (e.g., LibriSpeech, Common Voice, or Switchboard), domain-specific datasets (e.g., legal intake call recordings or client communication archives), and/or synthetically generated speech created through text-to-speech augmentation to balance vocabulary distribution. In an embodiment, the training process may involve supervised learning, where the model parameters are iteratively optimized to minimize a transcription error metric such as connectionist temporal classification (CTC) loss or cross-entropy loss across the predicted and true text sequences. In some embodiments, transfer learning techniques may be applied, initializing the model with pretrained weights from general-purpose speech models and fine-tuning them using firm-specific or legal-domain audio data. The training pipeline may operate on distributed computing resources and periodically refresh model parameters as new annotated speech data is collected through system operation. In an embodiment, this continuous adaptation may allow the ASR model 156 to remain sensitive to domain-specific terminology, regional dialects, and conversational structures typical of client intake interactions, thereby enhancing transcription accuracy and improving the downstream generation of inquiry objects 124 within the overall system.

With continued reference to FIG. 1, in an embodiment, the conversion process may be accomplished by sampling the audio data stream 152 at a defined frequency, extracting acoustic features such as Mel-frequency cepstral coefficients (MFCCs), and feeding those features into the ASR model 156 for decoding. In an embodiment, the output text-based representation 154 may then be pre-processed to remove noise, normalize formatting, and encode the transcription in a schema-compatible structure. In an embodiment, at least a processor 108 may store or transmit the resulting text-based representation 154 to a classification module or schema mapping engine, allowing system 100 to treat spoken inputs equivalently to textual or form-based inputs within the unified inquiry-object framework.

In continued reference to FIG. 1, in an embodiment, where the at least one input data stream 120 includes a textual data stream 158, generating the inquiry object 124 may include parsing, tokenizing, and/or otherwise analyzing the textual data stream 158 to extract semantically relevant content. For purposes of this disclosure, a "textual data stream" is a digital flow of written or transcribed language data. In an embodiment, the textual data stream 158 may be received as raw text, structured form entries, email bodies, chat messages, and/or other document-based submissions. Non-limiting examples of textual data streams 158 may include email correspondence from prospective clients, text-based chat transcripts, data captured from web intake forms, and uploaded documents such as PDF questionnaires or message logs. In an embodiment, textual data streams 158 may provide direct linguistic input that can be processed using natural-language-understanding components without requiring acoustic-to-text conversion. Accordingly, these streams may serve as low-latency, structured sources of information used to populate and update inquiry objects 124 within the intake pipeline.

With further reference to FIG. 1, in an embodiment, at least a processor 108 may perform a series of preprocessing and normalization operations on the textual data stream 158 prior to inquiry-object generation. Such preprocessing may include language detection, removal of non-semantic artifacts (e.g., email headers, HTML tags, or special characters), and/or standardization of encoding formats such as UTF-8. The textual data stream 158 may then be segmented into logical units, sentences, phrases, or tokens, using one or more natural-language-processing frameworks. In an embodiment, tokenization may be followed by lemmatization, stemming, and/or part-of-speech tagging to reduce lexical variation and facilitate consistent feature extraction across heterogeneous data sources. The resulting normalized text may be embedded into a vector representation using a language model such as a transformer, recurrent neural network (RNN), or word-embedding algorithm (e.g., Word2Vec, GloVe, or BERT). These embeddings may then serve as structured linguistic features for downstream classification, allowing the system to infer attributes such as practice area, urgency, and jurisdiction from purely textual submissions.

In further reference to FIG. 1, in some embodiments, the textual data stream 158 may be used as training or fine-tuning data for the natural-language-understanding components of the system. Training data may include pairs of text inputs and their corresponding labeled outcomes, such as assigned taxonomy nodes or case-type identifiers, and may be collected from historical intake records, annotated communications, and/or synthetically generated examples reflecting domain-specific phrasing. During training, model parameters may be optimized to minimize a classification or cross-entropy loss function, improving accuracy in mapping text features to taxonomy nodes. In an embodiment, transfer-learning approaches may also be utilized, where pretrained language models are adapted to firm-specific vocabularies and idiomatic expressions common in client inquiries. The resulting trained model may enable at least a processor 108 to dynamically classify incoming textual data streams 158 with high contextual precision, thereby generating inquiry objects 124 that capture both the semantic meaning and operational relevance of each submission.

In continued reference to FIG. 1, in an embodiment, textual data streams 158 and/or text-based representations 154 may be processed by a language processing module. Language processing module may include any hardware and/or software module. Language processing module may be configured to extract, from the one or more documents, one or more words. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

Still referring to FIG. 1, language processing module may operate to produce a language processing model. Language processing model may include a program automatically generated by computing device and/or language processing module to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device, or the like.

Still referring to FIG. 1, language processing module and/or diagnostic engine may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between an extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Alternatively, or additionally, and with continued reference to FIG. 1, language processing module may be produced using one or more large language models (LLMs). A "large language model," as used herein, is a deep learning data structure that can recognize, summarize, translate, predict and/or generate text and other content based on knowledge gained from massive datasets. Large language models may be trained on large sets of data. In some embodiments, the training data for such models may be drawn from diverse textual sources representative of natural client communication patterns and professional documentation. Non-limiting examples of such data sources may include anonymized client intake forms, email correspondence, chat transcripts, case summaries, call transcripts converted from audio data streams 152, publicly available legal filings, and web-based intake templates. In some embodiments, training sets may further include internal firm records or curated examples of historical intake communications paired with corresponding case outcomes, allowing the model to learn relationships between linguistic features and taxonomy classifications. In certain embodiments, training data may also incorporate domain-specific corpora, such as legal glossaries, procedural guides, or structured metadata derived from case-management databases, to enhance contextual precision during classification. In an embodiment, an LLM may include one or more architectures based on capability requirements of an LLM. Exemplary architectures may include, without limitation, GPT (Generative Pretrained Transformer), BERT (Bidirectional Encoder Representations from Transformers), T5 (Text-To-Text Transfer Transformer), and the like. Architecture choice may depend on a needed capability such generative, contextual, or other specific capabilities.

With continued reference to FIG. 1, in some embodiments, an LLM may be generally trained. As used in this disclosure, a "generally trained" LLM is an LLM that is trained on a general training set comprising a variety of subject matters, data sets, and fields. In some embodiments, an LLM may be initially generally trained. Additionally, or alternatively, an LLM may be specifically trained. As used in this disclosure, a "specifically trained" LLM is an LLM that is trained on a specific training set, wherein the specific training set includes data including specific correlations for the LLM to learn. As a non-limiting example, an LLM may be generally trained on a general training set, then specifically trained on a specific training set. In an embodiment, specific training of an LLM may be performed using a supervised machine learning process. In some embodiments, generally training an LLM may be performed using an unsupervised machine learning process. As a non-limiting example, specific training set may include information from a database. As a non-limiting example, specific training set may include text related to the users such as user specific data for electronic records correlated to examples of outputs. In an embodiment, training one or more machine learning models may include setting the parameters of the one or more models (weights and biases) either randomly or using a pretrained model. Generally training one or more machine learning models on a large corpus of text data can provide a starting point for fine-tuning on a specific task. A model such as an LLM may learn by adjusting its parameters during the training process to minimize a defined loss function, which measures the difference between predicted outputs and ground truth. Once a model has been generally trained, the model may then be specifically trained to fine-tune the pretrained model on task-specific data to adapt it to the target task. Fine-tuning may involve training a model with task-specific training data, adjusting the model's weights to optimize performance for the particular task. In some cases, this may include optimizing the model's performance by fine-tuning hyperparameters such as learning rate, batch size, and regularization. Hyperparameter tuning may help in achieving the best performance and convergence during training. In an embodiment, fine-tuning a pretrained model such as an LLM may include fine-tuning the pretrained model using Low-Rank Adaptation (LoRA). As used in this disclosure, "Low-Rank Adaptation" is a training technique for large language models that modifies a subset of parameters in the model. Low-Rank Adaptation may be configured to make the training process more computationally efficient by avoiding a need to train an entire model from scratch. In an exemplary embodiment, a subset of parameters that are updated may include parameters that are associated with a specific task or domain.

With continued reference to FIG. 1, in some embodiments an LLM may include and/or be produced using Generative Pretrained Transformer (GPT), GPT-2, GPT-3, GPT-4, and the like. GPT, GPT-2, GPT-3, GPT-3.5, and GPT-4 are products of Open AI Inc., of San Francisco, CA. In an embodiment, an LLM may implement a text-prediction-based algorithm configured to receive a textual prompt, such as a partial client inquiry or intake statement, and apply a probability distribution across the vocabulary to predict the next most likely token or phrase. For example, if the text received from a client begins with "I was injured in a . . . ," the model may assign high probability to completions such as "car accident," "workplace accident," or "slip and fall," based on contextual learning from prior training data. The model may output such predictions by ranking possible words or phrases by likelihood, thereby enabling contextual completion, entity recognition, and semantic classification of intake narratives. In certain embodiments, the LLM may include an encoder component and a decoder component configured to operate jointly for contextual embedding and text generation. The encoder component may analyze input sequences to capture semantic and syntactic relationships between words and phrases, while the decoder component may generate predictive completions or summaries that align with the system's predefined taxonomy nodes. Together, these components may allow the LLM to produce refined textual representations suitable for use in classification, confidence scoring, and inquiry-object generation within the multi-modal intake system.

Still referring to FIG. 1, an LLM may include a transformer architecture. In some embodiments, encoder component of an LLM may include transformer architecture. A "transformer architecture," for the purposes of this disclosure is a neural network architecture that uses self-attention and positional encoding. Transformer architecture may be designed to process sequential input data, such as natural language, with applications towards tasks such as translation and text summarization. Transformer architecture may process the entire input all at once. "Positional encoding," for the purposes of this disclosure, refers to a data processing technique that encodes the location or position of an entity in a sequence. In some embodiments, each position in the sequence may be assigned a unique representation. In some embodiments, positional encoding may include mapping each position in the sequence to a position vector. In some embodiments, trigonometric functions, such as sine and cosine, may be used to determine the values in the position vector. In some embodiments, position vectors for a plurality of positions in a sequence may be assembled into a position matrix, wherein each row of position matrix may represent a position in the sequence.

With continued reference to FIG. 1, an LLM and/or transformer architecture may include an attention mechanism. An "attention mechanism," as used herein, is a part of a neural architecture that enables a system to dynamically quantify the relevant features of the input data. In the case of natural language processing, input data may be a sequence of textual elements. It may be applied directly to the raw input or to its higher-level representation.

With continued reference to FIG. 1, attention mechanism may represent an improvement over a limitation of an encoder-decoder model. An encoder-decider model encodes an input sequence to one fixed length vector from which the output is decoded at each time step. This issue may be seen as a problem when decoding long sequences because it may make it difficult for the neural network to cope with long sentences, such as those that are longer than the sentences in the training corpus. Applying an attention mechanism, an LLM may predict the next word by searching for a set of positions in a source sentence where the most relevant information is concentrated. An LLM may then predict the next word based on context vectors associated with these source positions and all the previously generated target words, such as textual data of a dictionary correlated to a prompt in a training data set. A "context vector," as used herein, are fixed-length vector representations useful for document retrieval and word sense disambiguation.

Still referring to FIG. 1, attention mechanism may include, without limitation, generalized attention self-attention, multi-head attention, additive attention, global attention, and the like. In generalized attention, when a sequence of words or an image is fed to an LLM, it may verify each element of the input sequence and compare it against the output sequence. Each iteration may involve the mechanism's encoder capturing the input sequence and comparing it with each element of the decoder's sequence. From the comparison scores, the mechanism may then select the words or parts of the image that it needs to pay attention to. In self-attention, an LLM may pick up particular parts at different positions in the input sequence and over time compute an initial composition of the output sequence. In multi-head attention, an LLM may include a transformer model of an attention mechanism. Attention mechanisms, as described above, may provide context for any position in the input sequence. For example, if the input data is a natural language sentence, the transformer does not have to process one word at a time. In multi-head attention, computations by an LLM may be repeated over several iterations, each computation may form parallel layers known as attention heads. Each separate head may independently pass the input sequence and corresponding output sequence element through a separate head. A final attention score may be produced by combining attention scores at each head so that every nuance of the input sequence is taken into consideration. In additive attention (Bahdanau attention mechanism), an LLM may make use of attention alignment scores based on a number of factors. Alignment scores may be calculated at different points in a neural network, and/or at different stages represented by discrete neural networks. Source or input sequence words are correlated with target or output sequence words but not to an exact degree. This correlation may take into account all hidden states and the final alignment score is the summation of the matrix of alignment scores. In global attention (Luong mechanism), in situations where neural machine translations are required, an LLM may either attend to all source words or predict the target sentence, thereby attending to a smaller subset of words.

With continued reference to FIG. 1, multi-headed attention in encoder may apply a specific attention mechanism called self-attention. Self-attention allows models such as an LLM or components thereof to associate each word in the input, to other words. For example, in an embodiment, the model may learn to associate the term "accident" with nearby tokens such as "car," "rear-ended," or "injury," inferring that the input likely pertains to a personal-injury matter. In another embodiment, the model may learn that phrases such as "file for custody" or "divorce decree" co-occur frequently in family-law contexts, thereby strengthening its ability to assign the inquiry to an appropriate taxonomy node. This internal representation of relationships between terms may allow system 100 to capture semantic dependencies that extend beyond simple keyword matching, thereby improving the precision of inquiry-object classification. In some embodiments, to achieve self-attention, input may be fed into three distinct fully connected neural network layers to create query, key, and value vectors. A query vector may include an entity's learned representation for comparison to determine attention score. A key vector may include an entity's learned representation for determining the entity's relevance and attention weight. A value vector may include data used to generate output representations. Query, key, and value vectors may be fed through a linear layer; then, the query and key vectors may be multiplied using dot product matrix multiplication in order to produce a score matrix. The score matrix may determine the amount of focus for a word should be put on other words (thus, each word may be a score that corresponds to other words in the time-step). The values in score matrix may be scaled down. As a non-limiting example, score matrix may be divided by the square root of the dimension of the query and key vectors. In some embodiments, the softmax of the scaled scores in score matrix may be taken. The output of this softmax function may be called the attention weights. Attention weights may be multiplied by your value vector to obtain an output vector. The output vector may then be fed through a final linear layer.

Still referencing FIG. 1, in order to use self-attention in a multi-headed attention computation, query, key, and value may be split into N vectors before applying self-attention. Each self-attention process may be called a "head." Each head may produce an output vector and each output vector from each head may be concatenated into a single vector. This single vector may then be fed through the final linear layer discussed above. In theory, each head can learn something different from the input, therefore giving the encoder model more representation power.

With continued reference to FIG. 1, encoder of transformer may include a residual connection. Residual connection may include adding the output from multi-headed attention to the positional input embedding. In some embodiments, the output from residual connection may go through a layer normalization. In some embodiments, the normalized residual output may be projected through a pointwise feed-forward network for further processing. The pointwise feed-forward network may include a couple of linear layers with a ReLU activation in between. The output may then be added to the input of the pointwise feed-forward network and further normalized.

Continuing to refer to FIG. 1, transformer architecture may include a decoder. Decoder may a multi-headed attention layer, a pointwise feed-forward layer, one or more residual connections, and layer normalization (particularly after each sub-layer), as discussed in more detail above. In some embodiments, decoder may include two multi-headed attention layers. In some embodiments, decoder may be autoregressive. For the purposes of this disclosure, "autoregressive" means that the decoder takes in a list of previous outputs as inputs along with encoder outputs containing attention information from the input.

With further reference to FIG. 1, in some embodiments, input to decoder may go through an embedding layer and positional encoding layer in order to obtain positional embeddings. Decoder may include a first multi-headed attention layer, wherein the first multi-headed attention layer may receive positional embeddings.

With continued reference to FIG. 1, first multi-headed attention layer may be configured to not condition to future tokens. As a non-limiting example, when computing attention scores on the word "am," decoder should not have access to the word "fine" in "I am fine," because that word is a future word that was generated after. The word "am" should only have access to itself and the words before it. In some embodiments, this may be accomplished by implementing a look-ahead mask. Look ahead mask is a matrix of the same dimensions as the scaled attention score matrix that is filled with "0s" and negative infinities. For example, the top right triangle portion of look-ahead mask may be filled with negative infinities. Look-ahead mask may be added to scaled attention score matrix to obtain a masked score matrix. Masked score matrix may include scaled attention scores in the lower-left triangle of the matrix and negative infinities in the upper-right triangle of the matrix. Then, when the softmax of this matrix is taken, the negative infinities will be zeroed out; this leaves zero attention scores for "future tokens."

Still referring to FIG. 1, second multi-headed attention layer may use encoder outputs as queries and keys and the outputs from the first multi-headed attention layer as values. This process matches the encoder's input to the decoder's input, allowing the decoder to decide which encoder input is relevant to put a focus on. The output from second multi-headed attention layer may be fed through a pointwise feedforward layer for further processing.

With continued reference to FIG. 1, the output of the pointwise feedforward layer may be fed through a final linear layer. This final linear layer may act as a classifier. This classifier may be as big as the number of classes that you have. For example, if you have 10,000 classes for 10,000 words, the output of that classifier will be of size 10,000. The output of this classifier may be fed into a softmax layer which may serve to produce probability scores between zero and one. The index may be taken of the highest probability score in order to determine a predicted word.

Still referring to FIG. 1, decoder may take this output and add it to the decoder inputs. Decoder may continue decoding until a token is predicted. Decoder may stop decoding once it predicts an end token.

Continuing to refer to FIG. 1, in some embodiment, decoder may be stacked N layers high, with each layer taking in inputs from the encoder and layers before it. Stacking layers may allow an LLM to learn to extract and focus on different combinations of attention from its attention heads.

With continued reference to FIG. 1, an LLM may receive an input. Input may include a string of one or more characters. Inputs may additionally include unstructured data. For example, input may include one or more words, a sentence, a paragraph, a thought, a query, and the like. A "query" for the purposes of the disclosure is a string of characters that poses a question. In some embodiments, input may be received from a user device. User device may be any computing device that is used by a user. As non-limiting examples, user device may include desktops, laptops, smartphones, tablets, and the like. In some embodiments, input may include any set of data associated with a prospective client's submission describing an incident or legal concern, such as "I was rear-ended on the highway and need to know if I have a personal injury claim," or "My employer has not paid me overtime for six months."

With continued reference to FIG. 1, an LLM may generate at least one annotation as an output. At least one annotation may be any annotation as described herein. In some embodiments, an LLM may include multiple sets of transformer architecture as described above. Output may include a textual output. A "textual output," for the purposes of this disclosure is an output comprising a string of one or more characters. Textual output may include, for example, a plurality of annotations for unstructured data. In some embodiments, textual output may include a phrase or sentence identifying the status of a user query. In some embodiments, textual output may include a sentence or plurality of sentences describing a response to a user query. As a non-limiting example, this may include restrictions, timing, advice, dangers, benefits, and the like.

Continuing to refer to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, language processing module may use a corpus of documents to generate associations between language elements in a language processing module, and diagnostic engine may then use such associations to analyze words extracted from one or more documents and determine that the one or more documents indicate significance of a category. In an embodiment, language module and/or computing device 104 may perform this analysis using a selected set of significant documents, such as documents identified by one or more experts as representing good information; experts may identify or enter such documents via graphical user interface, or may communicate identities of significant documents according to any other suitable method of electronic communication, or by providing such identity to other persons who may enter such identifications into computing device 104. Documents may be entered into a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, diagnostic engine may automatically obtain the document using such an identifier, for instance by submitting a request to a database or compendium of documents such as JSTOR as provided by Ithaka Harbors, Inc. of New York.

Still referring to FIG. 1, in an embodiment, each input data stream of the plurality of input data streams 121 may include a source identifier 160. For purposes of this disclosure, a "source identifier" is a unique data tag, token, or metadata field associated with an incoming data stream that encodes information about the origin, transmission channel, or context of that stream. In an embodiment, a source identifier 160 may include, without limitation, a user ID, device ID, session ID, email address, phone number, web form identifier, API key, and/or cryptographic token embedded in the data transmission. Non-limiting examples of source identifiers 160 may include a caller ID associated with a voice intake call, a message header embedded within an email submission, a form field ID associated with a specific online intake questionnaire, and/or a timestamped session token generated by a client portal.

In further reference to FIG. 1, in an embodiment, the source identifier 160 may serve as a linkage mechanism that allows multiple data streams originating from the same user or event to be associated, synchronized, and consolidated into a single inquiry object 124. For example, a client may submit an initial web form describing their issue, followed by an uploaded document and a subsequent phone call; each corresponding input data stream may carry the same source identifier 160 or a hash-derived equivalent, thereby enabling system 100 to pair and reconcile these related data streams within the intake pipeline. This functionality may prevent duplication, preserve chronological context, and ensure that updates or corrections to submitted information are accurately reflected in the unified inquiry record. In an embodiment, at least a processor 108 may extract the source identifier 160 from metadata accompanying the incoming data stream and register it within a temporary mapping table or distributed key-value store. System 100 may use hash-matching or probabilistic correlation techniques, such as fuzzy matching or vector similarity scoring, to detect near-duplicate identifiers or resolve mismatches caused by encoding differences across transmission channels. Once matched, system 100 may tag the associated inquiry objects 124 with a persistent identifier, allowing subsequent classification, filtering, and/or reinforcement-learning operations to treat multi-channel data from a single source as a coherent unit. This architecture may improve contextual accuracy, reduce redundant processing, and maintain continuity across multiple intake events originating from the same user or client entity.

In further reference to FIG. 1, in an embodiment, generating the inquiry object 124 may include pairing two or more input data streams as a function of the source identifier 160. For purposes of this disclosure, "pairing" is the process of associating two or more data streams that share a common or correlatable source identifier 160. Such that the pairing ensures system 100 recognizes them as originating from the same user, event, and/or session. For example, a prospective client may complete an online form providing initial details about a case, then later submit additional information through email or a recorded phone message. Each of these submissions may generate a separate input data stream, but because each stream contains the same source identifier 160 (e.g., an assigned session token, email hash, or caller ID match), system 100 can detect their shared origin and pair them accordingly. In an embodiment, this pairing process may allow data from different modalities, such as audio, textual, and structured form-based input, to be contextually aligned, preserving continuity across multiple submission events and ensuring that all related information is processed under a unified client context.

With continued reference to FIG. 1, in an embodiment, pairing may be accomplished using a correlation engine configured to monitor incoming input data streams and perform source identifier 160 matching in real time. In an embodiment, system 100 may use a combination of exact matching (e.g., string or hash comparison) and approximate matching techniques (e.g., fuzzy text similarity or probabilistic record linkage) to detect associations even when identifiers are partially modified or encoded differently across communication channels. Once a match is detected, at least a processor 108 may store pairing metadata in a temporary index or a distributed in-memory database, linking the relevant streams for downstream processing. In some embodiments, system 100 may assign a unique composite key to each paired group of input data streams, allowing subsequent classification and schema mapping to operate on a coherent, contextually unified dataset.

In continued reference to FIG. 1, in some embodiments, the correlation engine may be implemented as a subcomponent or operational module within the detection layer 174 described in further detail below. The detection layer 174, in such embodiments, may serve as a supervisory data-monitoring framework responsible for observing incoming input data streams, identifying correlation events, and/or initiating pairing or modification operations when new or related information is detected. Within this architecture, the correlation engine may specifically perform the task of analyzing identifiers, timestamps, and/or semantic signatures embedded within each input data stream to determine whether two or more streams originate from a common source. In an embodiment, the correlation engine may receive, as inputs, normalized data stream metadata, extracted source identifiers 160, and/or contextual embeddings derived from textual or transcribed content. In response, the correlation engine may output one or more pairing decisions, which may include (i) an association confidence score 136 indicating the likelihood that two or more streams belong to the same origin, and/or (ii) a correlation record containing unique mapping identifiers used to synchronize related inquiry objects 124. These outputs may be passed downstream to the inquiry-object generation module or stored in a temporary relational index for use in subsequent classification and filtering operations.

Still referring to FIG. 1, in an embodiment, the correlation engine may be trained using a combination of labeled and unlabeled datasets that represent real or simulated intake events across multiple communication channels. Labeled training data may include pairs of data stream samples manually annotated as “related” or “unrelated,” enabling system 100 to learn discriminative features associated with cross-channel relationships. In an embodiment, such training data may be sourced from historical intake records, archived client communications, and/or synthetically generated examples that simulate variations in input identifiers, timestamps, or lexical content. The training process may employ supervised or semi-supervised machine-learning techniques, such as gradient-boosted decision trees, Siamese neural networks, and/or transformer-based embedding models, depending on the complexity of the correlation task. In an embodiment, during training, model parameters may be iteratively adjusted to minimize a correlation loss function, such as contrastive loss or triplet loss, ensuring that embeddings for related data streams are positioned closer in the learned feature space than those for unrelated streams. In certain embodiments, the correlation engine may continue to refine its internal parameters through reinforcement learning or feedback derived from confirmed intake pairings over time, allowing the model to adapt dynamically to new communication patterns, identifier structures, and user behaviors.

With further reference to FIG. 1, in an embodiment, at least a processor 108 may be configured to generate, as a function of the at least one input data stream 120, an inquiry object 124. For purposes of this disclosure, an “inquiry object” is a structured digital data construct that encapsulates information derived from one or more input data streams representing a client inquiry, communication, or submission event. In an embodiment, the inquiry object 124 may serve as the system’s fundamental data unit for downstream classification, filtering, and routing operations. In some embodiments, an inquiry object 124 may include fields corresponding to extracted or computed parameters such as client identifiers, practice area indicators, urgency scores, jurisdictional data, communication channel metadata, and/or timestamps. Non-limiting examples of inquiry objects 124 may include: (i) a record generated from a transcribed client intake call that includes structured text and extracted entities (e.g., “car accident,” “rear-ended,” “personal injury”), (ii) a structured representation of an email submission containing demographic and jurisdictional metadata, and/or (iii) an aggregated object containing both textual form data and associated audio transcripts linked to the same source identifier 160. In this context, each inquiry object 124 may represent a unified, machine-readable representation of a prospective client interaction, allowing system 100 to apply consistent analytical and classification processes across otherwise heterogeneous inputs.

In further reference to FIG. 1, in an embodiment, at least a processor 108 may generate an inquiry object 124 by executing a data transformation pipeline that receives raw input data streams and converts them into schema-compliant object representations. This may involve parsing incoming data, performing text extraction or speech-to-text transcription (in the case of audio streams), and assigning standardized field values based on a predefined schema. System 100 may additionally perform feature encoding, converting unstructured text or metadata into numerical vectors or categorical representations suitable for downstream model input. Once generated, the inquiry object 124 may be assigned a unique object identifier and stored within a structured database 162 or in-memory data store to enable rapid retrieval, correlation, and reinforcement-learning updates. In certain embodiments, inquiry object 124 generation may also include initial tagging with confidence values and/or context embeddings that represent semantic interpretations of the input, thus enabling adaptive downstream classification and ranking.

Still referring to FIG. 1, in an embodiment, generating the inquiry object 124 may include mapping one or more instances 126 of the at least one input data stream 120 to a predefined data schema 128. For purposes of this disclosure, “mapping” refers to the process of aligning, associating, or transforming raw or semi-structured input data elements into structured fields defined by a standardized data model. In an embodiment, mapping may enable system 100 to ensure that disparate input sources, such as text submissions, form entries, or transcribed audio content, are represented using a consistent structural format that supports machine learning, rule-based processing, and interoperability with external systems. For purposes of this disclosure, a “predefined data schema” is a structured data model defining the organization, data types, and relationships among the fields that comprise an inquiry object 124. In some embodiments, the predefined data schema 128 may include static or dynamically configurable field definitions corresponding to client-specific attributes and/or case-relevant variables. Non-limiting examples of schema fields may include a “client name”

field, a "contact information" field, a "practice area" field, a "jurisdiction" field, an "urgency" score, and/or one or more "issue description" or "keyword" fields. In an embodiment, the predefined data schema 128 may further specify data types for each field, such as text, integer, categorical label, date, or vector embedding, and may include validation constraints to ensure the accuracy and completeness of populated values.

With further reference to FIG. 1, in an embodiment, the mapping process may act as the intermediary layer between data ingestion and inquiry object 124 creation. In an embodiment, at least a processor 108 may perform mapping by applying natural-language-processing operations, entity recognition models, and/or rule-based parsers to extract structured information from unstructured or semi-structured input content. For instance, a client-submitted text stating "I was injured in a car accident in Georgia last week" may be automatically mapped to the schema fields "practice area: personal injury," "jurisdiction: Georgia," and "urgency: high," based on detected entities and temporal references. The mapping process may also include normalization of field values using predefined ontologies and/or controlled vocabularies, ensuring consistency across cases with equivalent meaning but differing phrasing (e.g., "auto accident" and "car crash"). In an embodiment, mapping may be implemented through a modular data-transformation engine that supports both deterministic and machine-learning-based extraction logic. System 100 may use pre-trained named-entity-recognition (NER) models to identify proper nouns, events, and/or locations, and transformer-based language models to infer missing field values or disambiguate ambiguous inputs. In an embodiment, the mapping engine may store field-to-source relationships within a schema registry, allowing each populated field of the inquiry object 124 to be traced back to its original data source for auditability and error correction. In certain embodiments, schema mapping may occur iteratively, where initial mappings are validated or refined through subsequent inputs or feedback from downstream models, thereby enabling adaptive schema alignment as the system processes new forms of intake data.

With further reference to FIG. 1, in an embodiment, generating the inquiry object 124 may include combining, as a function of paring the two or more input data streams, the one or more instances 126 of the two or more input data streams into a single inquiry object 124. For purposes of this disclosure, "combining" refers to the process of merging or integrating information derived from multiple, related input data streams into a single, unified data construct. For purposes of this disclosure, an "instance" is a discrete data representation generated from an individual input data stream. In an embodiment, an instance may include extracted fields, metadata, and/or any contextual embeddings derived during preprocessing or schema mapping. In some embodiments, each instance may represent a separate modality (e.g., audio, textual, or form-based input) or a distinct submission event (e.g., a follow-up message or document upload) that contributes partial information relevant to a single client inquiry. Non-limiting examples of combining include: (i) merging a text-based form submission with an accompanying audio call transcript that references the same case details, (ii) unifying a client's follow-up email providing additional facts with their previously submitted intake form, or (iii) linking a structured JSON submission received through an API endpoint with a corresponding chat transcript logged under the same source identifier 160. In these scenarios, the combining process may consolidate overlapping or complementary data into a single inquiry object 124 while maintaining provenance and data integrity. Each instance may retain an internal pointer to its originating data stream, allowing system 100 to track the lineage of all combined inputs and revert to the original context if necessary.

In continued reference to FIG. 1, in an embodiment, the combining operation may be managed by a correlation engine, optionally implemented as part of the detection layer 174. The correlation engine may identify related instances based on shared source identifiers 160, timestamps, and semantic similarity metrics derived from textual embeddings or feature vectors. Once related instances are identified, at least a processor 108 may initiate a merge sequence that performs record-level deduplication, field reconciliation, and cross-modality feature fusion. In an embodiment, deduplication may involve comparing overlapping field values and retaining the most recent, most confident, and/or most complete representation based on predefined weighting criteria. In an embodiment, field reconciliation may employ probabilistic data matching or Bayesian inference techniques to resolve conflicts among competing values.

In further reference to FIG. 1, in certain embodiments, system 100 may further employ a multimodal fusion model trained to integrate features across data types, such as linguistic embeddings from text, spectral embeddings from audio, and categorical attributes from structured inputs, into a shared latent representation. Training data for such a model may include, without limitation, paired examples of related intake submissions annotated by human reviewers or generated synthetically using augmentation pipelines. In an embodiment, the model may be trained using supervised or contrastive learning methods to minimize reconstruction or divergence loss across modalities. Once trained, this fusion model may enable at least a processor 108 to combine heterogeneous data streams into a contextually rich and semantically unified inquiry object 124 that captures the entirety of a client's communication history. The resulting unified inquiry object 124 may then proceed to downstream classification, filtering, and reinforcement-learning-based optimization within the overall intake pipeline.

With continued reference to FIG. 1, in an embodiment, where the two or more input data streams contain overlapping or inconsistent information, system 100 may be configured to perform conflict detection and reconciliation prior to finalizing the unified inquiry object 124. For purposes of this disclosure, "conflict detection" refers to the process of identifying discrepancies between equivalent or related fields originating from distinct instances of input data. For example, such as divergent dates, inconsistent jurisdictional entries, and/or contradictory textual statements. For purposes of this disclosure, "reconciliation" refers to the subsequent process of resolving these discrepancies through automated or semi-automated decision logic designed to preserve the most accurate, recent, or contextually relevant information. In an embodiment, these operations may ensure that the combined inquiry object 124 reflects a coherent and validated representation of the client's submission, even when data originate from multiple asynchronous channels or communication events. Non-limiting examples of conflict scenarios may include: (i) a client providing two different dates for the same incident in separate submissions, (ii) an audio transcript identifying one jurisdiction while a form field indicates another, and/or (iii) a follow-up email correcting an earlier error in the client's contact information. In these cases, system 100 may apply a multi-stage validation sequence that weighs input confidence scores 136, recency of submission, and model-based reliability metrics to determine which field values should be preserved. For example, when the conflict pertains to categorical fields such as "jurisdiction," at least a processor 108 may assign a higher weighting to the value extracted from the more recent or higher-confidence source. When the conflict involves free-text fields, system 100 may employ semantic similarity analysis to assess whether two textual entries convey the same meaning despite lexical variation.

Still referring to FIG. 1, in an embodiment, conflict detection may be implemented using rule-based comparison logic augmented with statistical or machine-learning models trained on historical correction patterns. In an embodiment, training data for these models may include labeled examples of past conflicts and their verified resolutions, allowing system 100 to learn common data inconsistency types and optimal reconciliation behaviors. The reconciliation component may operate as a submodule of the correlation engine or as an independent post-processing layer that consumes combined instance data and outputs a finalized, validated inquiry object 124. In some embodiments, a confidence-weighted ensemble model may be used to score competing data entries, combining factors such as source reliability, timestamp, and semantic coherence. At least a processor 108 may then update the inquiry object 124 to include the resolved field values while archiving the discarded alternatives and their associated metadata for auditability. This structured resolution process may enable system 100 to maintain both the interpretive accuracy and traceability of intake data, thereby strengthening the integrity and reliability of downstream classification and decision-making operations.

With continued reference to FIG. 1, in an embodiment, once the inquiry object 124 has been finalized through conflict resolution, system 100 may be configured to store and index the unified inquiry object 124 within a structured database 162 or data repository accessible to downstream processing modules. For purposes of this disclosure, "storing" refers to the process of writing a digital record representing the inquiry object 124 to a persistent or semi-persistent storage medium. While "indexing," for purposes of this disclosure, refers to the organization of such records using one or more identifiers or metadata fields that enable efficient retrieval and query-based access. In some embodiments, each inquiry object 124 may be associated with a unique object identifier, a timestamp of creation or modification, and/or one or more taxonomy-based tags or embeddings representing its classified context. Non-limiting examples of database structures suitable for storing inquiry objects 124 may include relational databases, document-oriented databases, and/or graph-based data stores. In an embodiment, a relational schema may be used when the inquiry object 124 is represented as a structured record with clearly defined fields, such as client details, incident descriptors, and classification metadata. In contrast, a document or graph database may be employed to preserve hierarchical relationships among heterogeneous data elements, such as embedded transcripts, file attachments, or cross-references to related cases. In an embodiment, the database may further maintain relational indices linking inquiry objects 124 that share common source identifiers 160, thereby supporting rapid retrieval of historical or multi-channel communication data.

With further reference to FIG. 1, in an embodiment, at least a processor 108 may serialize each finalized inquiry object 124 into a machine-readable format, such as JSON, Protobuf, or Avro, and transmit the serialized object to a storage service using an authenticated API layer 176. In an embodiment, system 100 may maintain a local cache or in-memory index for recently updated inquiry objects 124, enabling real-time access by the classification layer 130 and filtering layer 142. Query operations may employ full-text search indices, vector-based similarity search (for semantic embeddings), or hybrid query engines combining structured and unstructured retrieval capabilities. In some embodiments, system 100 may include an access-control submodule configured to enforce authentication, authorization, and encryption protocols 178 to ensure that inquiry-object data are securely stored and transmitted. The indexed inquiry objects 124 may thus serve as the foundation for all downstream operations, providing input data to classification models, supporting rule-based filtering workflows, and/or feeding annotated outcomes into reinforcement-learning pipelines for continuous system optimization.

With continued reference to FIG. 1, in an embodiment, at least a processor 108 may be configured to classify, using a classification layer 130, the inquiry object 124 to at least a taxonomy node 132 of a plurality of taxonomy nodes 134. For purposes of this disclosure, a "classification layer" is a computational subsystem or model architecture configured to assign a digital object to one or more predefined categorical classes or hierarchical nodes that represent structured areas of knowledge or operation. In an embodiment, the classification layer 130 may include one or more machine-learning models, statistical classifiers, and/or hybrid logic-based modules designed to interpret the structured fields, textual content, and contextual metadata of the inquiry object 124 and determine its appropriate placement within a defined case taxonomy. For purposes of this disclosure, a "taxonomy node" is a categorical element or node within a hierarchical or graph-based data structure that organizes inquiries according to semantically or operationally distinct classifications. In an embodiment, each taxonomy node may correspond to a practice area, case type, and/or subcategory of service relevance to a law firm or professional domain. Non-limiting examples of taxonomy nodes may include "Personal Injury," "Medical Malpractice," "Employment Dispute," "Contract Review," and/or "Family Law." In certain embodiments, each taxonomy node may include subnodes or linked relationships (e.g., "Personal Injury to Auto Accident to Commercial Trucking"), allowing the classification layer 130 to perform multi-level or multi-label assignments that reflect both broad and specific categorizations of the inquiry object 124.

In continued reference to FIG. 1, in an embodiment, the classification layer 130 may receive as input a vectorized or tokenized representation of the inquiry object 124 derived from the schema mapping and feature extraction processes described above. In an embodiment, the classification layer 130 may employ one or more deep-learning architectures, such as transformer-based encoders and/or convolutional neural networks, to identify semantic and contextual features relevant to classification. The classification layer 130 may output a probability distribution across the plurality of taxonomy nodes 134, with each value representing a confidence score 136 and/or likelihood that the inquiry object 124 belongs to a given category. In an embodiment, at least a processor 108 may select the highest-scoring taxonomy node, or in some embodiments, multiple nodes exceeding a confidence threshold, as the final classification result. In an embodiment, the classification layer 130 may be trained using supervised or semi-supervised learning approaches on labeled datasets including historical intake inquiries and their verified case outcomes. Training data may include, without limitation, both textual content (e.g., transcribed client statements, structured form responses) and associated metadata such as jurisdiction, urgency, and communication channel. In an embodiment, the classification model may be optimized to minimize a categorical cross-entropy loss function across training examples, thereby improving its ability to discriminate between closely related case types. In some embodiments, continual learning or online training techniques may be applied, enabling the classification model to adapt over time as new inquiries and confirmed case resolutions are added to the dataset. The output of the classification layer 130, including both the assigned taxonomy node(s) and their associated confidence scores 136, may be appended to the inquiry object 124, forming a semantically enriched and context-aware data structure for downstream filtering, routing, and feedback-learning operations.

In further reference to FIG. 1, in an embodiment, at least a processor 108 may be configured to generate, as a function of classifying the inquiry object 124 to the at least a taxonomy node 132 of the plurality of taxonomy nodes 134, a confidence score 136. For purposes of this disclosure, a "confidence score" is a quantitative indicator representing the statistical likelihood, model-assigned probability, or certainty value that the classification layer's assignment of the inquiry object 124 to a given taxonomy node is correct. In an embodiment, the confidence score 136 may be computed based on the normalized output probabilities of a classification model, such as a softmax layer in a neural network, and/or derived from aggregated similarity metrics when multiple classification algorithms contribute to a single decision. The confidence score 136 thus may provide a measurable signal of classification reliability and serve as a gating mechanism for downstream filtering, routing, and verification processes. In some embodiments, the confidence score 136 may range from 0 to 1, where a higher value corresponds to greater model certainty in the classification outcome. For example, if an inquiry object 124 containing the text "I slipped in a grocery store and broke my wrist" produces a model output of 0.92 for the taxonomy node "Personal Injury," 0.06 for "Medical Malpractice," and 0.02 for "Employment Dispute," the confidence score 136 of 0.92 indicates a strong likelihood that the inquiry correctly belongs to the "Personal Injury" category. In other embodiments, confidence scores 136 may be expressed as percentage values, scaled integers, and/or categorical confidence levels (e.g., "High," "Medium," "Low") based on configurable thresholds.

With further reference to FIG. 1, in an embodiment, generation of the confidence score 136 may include aggregating probabilistic outputs from one or more classification submodels, normalizing these outputs using techniques such as temperature scaling, Platt calibration, and/or isotonic regression to ensure calibration across taxonomy nodes. In an embodiment, at least a processor 108 may further adjust or refine confidence values by applying contextual weighting factors, such as the recency of the inquiry, completeness of data fields, and/or consistency of content across multiple data streams. In some cases, the confidence score 136 may be computed in real time as part of the classification process and stored as a numerical or vector attribute of the inquiry object 124. In some embodiments, system 100 may maintain historical distributions of confidence scores 136 across taxonomy nodes to enable meta-analysis, such as detecting concept drift or identifying underperforming categories that require retraining or reweighting of classification parameters.

Still referring to FIG. 1, in an embodiment, the confidence score 136 may be appended to the inquiry object 124 as an instance. In an embodiment, appending the confidence score 136 as an instance may enable system 100 to record the classification layer's evaluation results without altering or overwriting the original inquiry content. Each instance may therefore serve as an immutable snapshot of a specific computational event, such as classification, reclassification, or recalibration, providing traceability and context for subsequent learning and verification operations. In an embodiment, the appended instance may include fields identifying the classification timestamp, taxonomy node, confidence score 136 value, and/or model identifier that produced the score. For example, an inquiry object 124 corresponding to a client's "Auto Accident" submission may include a base schema with client demographics, event description, and/or jurisdictional data, followed by an appended instance that specifies "taxonomy_node: Personal Injury," "confidence_score: 0.91," "model_id: classifier_v2.3," and "timestamp: 2025-10-07T09:32:11Z." In some embodiments, multiple instances may be appended over time, reflecting reclassifications triggered by feedback data and/or retrained model outputs. This instance-based structure may allow system 100 to maintain longitudinal records of classification behavior across system iterations, supporting audit, analysis, and compliance requirements.

In continued reference to FIG. 1, in an embodiment, appending the confidence score 136 as an instance may be implemented through object versioning and/or document-based data models that support nested attribute storage. For example, the inquiry object 124 may be represented as a hierarchical data structure (e.g., JSON or BSON document) in which each instance is appended to an array of processing records. In an embodiment, at least a processor 108 may automatically generate and append these instances using an event-driven architecture, where classification events emit structured metadata to an ingestion pipeline that updates the database in near-real time. In some embodiments, instance creation may be governed by schema validation logic ensuring that confidence scores 136 adhere to predefined data types, precision formats, and node mappings. This architecture may allow the inquiry object 124 to evolve dynamically while preserving complete contextual lineage, ensuring that downstream modules such as the filtering layer 142 or reinforcement-learning engine can access both current and historical confidence data when performing adaptive recalibration.

Still referring to FIG. 1, in an embodiment, at least a processor 108 may be configured to determine for each taxonomy node of the plurality of taxonomy nodes 134, one or more node-specific weighting parameters 138. For purposes of this disclosure, a "node-specific weighting parameter" is a numerical or vectorized coefficient assigned to a given taxonomy node that adjusts the relative influence, reliability, or decision priority of that node within the classification and scoring pipeline. In an embodiment, these weighting parameters may serve to account for variations in model confidence calibration, data distribution imbalance, and/or contextual relevance across distinct categories of inquiry objects 124. In this way, node-specific weighting parameters may enable the classification system to dynamically tailor its evaluation criteria to the unique statistical or operational characteristics of each taxonomy node. Non-limiting examples of node-specific weighting parameters may include: (i) a confidence scaling factor applied to all inquiries classified under a specific practice area to compensate for model underconfidence; (ii) a reliability weight derived from historical outcome accuracy for that node, such as the ratio of correctly classified inquiries to total classified inquiries; and/or (iii) an urgency modifier reflecting time-sensitive or high-priority case categories. For example, if the "Employment Dispute" node historically exhibits lower classification accuracy than "Personal Injury," system 100 may automatically adjust the weighting parameter for "Employment Dispute" to increase its model sensitivity and reclassification frequency. Conversely, nodes associated with high-confidence, well-distributed data (e.g., "Auto Accident") may receive reduced weighting to prevent overfitting or dominance in probabilistic aggregation.

With further reference to FIG. 1, in an embodiment, at least a processor 108 may determine node-specific weighting parameters using statistical analysis, supervised learning, and/or reinforcement-based adjustment mechanisms applied to historical classification outcomes. In an embodiment, training data for this determination may include labeled inquiry objects 124, their verified taxonomy node assignments, and corresponding outcome data 180 received from integrated external systems, such as case management or CRM platforms. In an embodiment, at least a processor 108 may compute error metrics such as precision, recall, F1-score, and/or confusion matrix statistics for each taxonomy node and derive weighting adjustments that optimize overall classification performance. In some embodiments, system 100 may apply meta-learning or Bayesian optimization techniques to periodically recalibrate the weighting parameters as new labeled data becomes available. The weighting parameters may be stored as a lookup table, feature vector, and/or embedded model component, accessible to the classification layer 130 and scoring engine for real-time use during confidence score 136 generation and adaptive filtering operations. In an embodiment, the determination of node-specific weighting parameters may occur within a dedicated submodule of the classification layer 130 or as part of a higher-level optimization engine. This submodule may monitor ongoing classification performance, detect anomalies in confidence distribution, and trigger recalibration events when significant drift or degradation is detected. In some embodiments, reinforcement learning techniques may be employed, wherein system 100 receives positive or negative reward signals based on post-intake validation results and updates the weighting parameters accordingly. These adaptive updates may enable the classification pipeline to maintain accuracy and responsiveness across diverse inquiry patterns and evolving domain contexts.

In continued reference to FIG. 1, in an embodiment, at least a processor 108 may be configured to generate, for the inquiry object 124, a weighted confidence score 140 as a function of the confidence score 136 and the node-specific weighting parameters. For purposes of this disclosure, a "weighted confidence score" is an adjusted certainty value computed by applying one or more node-specific weighting parameters 138 to the baseline confidence score 136 generated by the classification layer 130. In an embodiment, the weighted confidence score 140 may provide a refined measure of classification reliability that accounts for context-dependent variability among taxonomy nodes, model calibration bias, or differential importance assigned to particular categories within the system. In some embodiments, the weighted confidence score 140 may be expressed as a continuous numerical value between 0 and 1, reflecting the adjusted probability that the inquiry object 124 has been correctly classified to a given taxonomy node. Non-limiting examples of weighted confidence scoring may include: (i) applying a scaling factor to amplify confidence values for underrepresented or low-frequency nodes, thereby ensuring sufficient sensitivity in downstream routing; (ii) attenuating confidence for overrepresented nodes prone to false positives; and/or (iii) adjusting confidence upward for nodes historically associated with high model precision and verified outcomes. For instance, if an inquiry object 124 is initially classified under the "Employment Dispute" taxonomy node with a confidence score 136 of 0.72 and that node's weighting parameter is 1.15 (reflecting underrepresentation in training data), the resulting weighted confidence score 140 may be computed as $0.72 \times 1.15 = 0.828$. This adjusted value would then be appended to the inquiry object 124, signaling higher trust in the classification for subsequent filtering and routing operations.

With further reference to FIG. 1, in an embodiment, generation of the weighted confidence score 140 may include multiple computational stages. In an embodiment, at least a processor 108 may retrieve node-specific weighting parameters from a stored configuration table and/or dynamically compute them based on current performance metrics. At least a processor 108 may then apply one or more transformation functions, such as linear scaling, logistic normalization, or Bayesian recalibration, to integrate the weighting parameters with the raw confidence score 136. In some embodiments, the weighted confidence score 140 may incorporate additional contextual factors, including data quality indices, inquiry completeness metrics, and/or the recency of user-provided information. The result of this computation may be stored as a structured field within the inquiry object 124 and utilized by the filtering layer 142 to determine whether the object meets inclusion criteria for downstream processing. In an embodiment, at least a processor 108 may execute this computation within a dedicated scoring engine configured to operate asynchronously from the classification layer 130 to reduce latency. The scoring engine may maintain an audit log of all confidence-weighting events, enabling traceability of how each weighted score was derived and applied. In some embodiments, system 100 may apply ensemble weighting, combining multiple node-specific parameters (e.g., accuracy weight, urgency weight, and cost-of-error weight) through a vector aggregation process to generate a composite weighted confidence score 140. In an embodiment, these aggregated values may then be propagated through subsequent stages of the intake pipeline, such as filtering, feedback, and adaptive retraining, to inform both immediate decision-making and long-term reinforcement-learning updates.

In continued reference to FIG. 1, in an embodiment, at least a processor 108 may be configured to filter, using a filtering layer 142, an accumulated set of inquiry objects 144 as a function of the confidence score 136 and a predefined rule set 146 associated with the at least a taxonomy node 132 of the plurality of taxonomy nodes 134. For purposes of this disclosure, a "filtering layer" is a computational subsystem or module configured to evaluate inquiry objects 124 against quantitative and qualitative criteria to determine their eligibility for further processing, routing, or storage within the system. In an embodiment, the filtering layer 142 may operate as an intermediary gatekeeper between the classification subsystem and downstream modules, such as case routing, CRM synchronization, and/or reinforcement-learning feedback loops. In some embodiments, the filtering layer 142 may include rule-based decision logic, thresholding mechanisms, and/or machine-learning models trained to identify valid, incomplete, and/or disqualified submissions based on the weighted confidence score 140 and contextual attributes of each inquiry object 124. For purposes of this disclosure, an "accumulated set of inquiry objects" refers to the collection of inquiry objects received, processed, and temporarily or persistently stored within a given operational cycle or time window. In an embodiment, the accumulated set may include objects from multiple communication channels (e.g., web form, email, phone transcript) and at varying stages of processing (e.g., initial classification, pending verification, or awaiting enrichment). In some embodiments, the filtering layer 142 may process this accumulated set in batch or continuous streaming mode, applying predefined rules and adaptive models to maintain a curated subset of inquiry objects 124 deemed complete, compliant, and relevant. For example, an accumulated set of 1,000 inquiry objects 124 may include a mixture of valid leads, incomplete records missing jurisdictional data, and duplicate or low-confidence submissions. In an embodiment, the filtering layer 142 may select only those meeting a confidence threshold (e.g., ≥0.80) and compliance criteria for inclusion in downstream workflows.

With further reference to FIG. 1, for purposes of this disclosure, a "predefined rule set" is a collection of conditional statements or parameterized logic structures that encode filtering criteria associated with specific taxonomy nodes or operational contexts. In an embodiment, each rule set may define thresholds, required fields, confidence minimums, and/or exception-handling logic tailored to the characteristics of that node. Non-limiting examples of predefined rule sets 146 may include: (i) a "Personal Injury" node rule requiring a minimum confidence score 136 of 0.85 and presence of both "incident date" and "injury description" fields; (ii) a "Contract Review" node rule requiring document attachments and jurisdictional metadata; and/or (iii) a "Family Law" node rule that flags inquiries containing specific keywords such as "custody" or "divorce" for expedited human review. In some embodiments, these rule sets may be stored in a configuration database and dynamically updated through an administrative interface and/or learned adaptively based on system feedback.

In further reference to FIG. 1, in an embodiment, the filtering layer 142 may evaluate each inquiry object 124 within the accumulated set of inquiry objects 144 using a multi-stage filtering pipeline. In a first stage, deterministic rules (e.g., required fields, minimum confidence score 136) may be applied for initial exclusion of incomplete or invalid entries. In a second stage, machine-learning models, such as gradient-boosted decision trees or neural scoring functions, may be used to identify nuanced disqualifying conditions (e.g., spam patterns, linguistic anomalies, and/or inconsistent metadata). In an embodiment, the filtering results may be encoded as binary flags or scalar "filtering scores," appended to the inquiry objects 124 as additional instances. In an embodiment, at least a processor 108 may then produce a filtered set of inquiry objects 164 suitable for downstream synchronization or routing, while optionally triggering supplemental information requests 168 or feedback signals for filtered-out entries. This layered architecture may allow the filtering system to combine deterministic precision with adaptive learning, ensuring consistent performance and continuous improvement as new data and classification behaviors emerge.

With continued reference to FIG. 1, in an embodiment, the machine-learning models utilized within the second stage of the filtering layer 142 may be configured to learn predictive patterns that distinguish high-quality or relevant inquiry objects 124 from incomplete, duplicative, or non-actionable submissions. In an embodiment, the inputs to such models may include structured features derived from inquiry object 124 metadata, such as taxonomy node identifiers, weighted confidence scores 140, completeness metrics, and timestamp patterns, as well as unstructured features extracted from textual content, including term frequency vectors, semantic embeddings, and/or linguistic quality indicators. In some embodiments, contextual features such as source channel (e.g., web form, audio transcript, email), prior user interaction history, and previously assigned filtering outcomes may also be incorporated as model inputs to improve contextual sensitivity. The outputs of the model may include, without limitation, a scalar probability or classification label indicating whether an inquiry object 124 should be accepted, rejected, or flagged for review. In an embodiment, training data for these models may include historical inquiry objects 124 and their associated filtering outcomes, such as whether a submission was ultimately validated, completed, or disqualified during intake processing. In some embodiments, the training dataset may be enriched with post-resolution signals, such as whether the inquiry converted to an active case or was marked as spam or duplicate by human reviewers. In some cases, training data may be sourced from internal system logs, CRM system feedback, and/or external labeling processes performed by human annotators. In an embodiment, the models may be trained using supervised learning techniques, optimizing a binary or multi-class objective function such as cross-entropy loss or F1-score maximization. In other embodiments, semi-supervised or reinforcement-learning methods may be used to continuously improve performance as new labeled examples are generated through normal system operation. In an embodiment, model retraining may occur periodically or asynchronously using a background training pipeline connected to the structured database 162. The retraining process may monitor drift metrics, such as changes in data distribution or confidence-score variance and automatically trigger model updates when degradation in filtering accuracy is detected. The resulting models may be version-controlled and deployed using a containerized inference service, allowing system 100 to compare historical and updated model performance in real time. In an embodiment, the inclusion of these adaptive learning models within the filtering layer 142 may allow system 100 to refine its quality-control thresholds dynamically, reducing manual oversight while improving precision and recall across diverse intake contexts.

With further reference to FIG. 1, in an embodiment, at least a processor 108 may be configured to store, in a structured database 162 configured for secure synchronization with one or more external systems 177, a filtered set of inquiry objects 164 as a function of filtering the accumulated set of inquiry objects 144. For purposes of this disclosure, a "structured database" is a data storage system that organizes records according to a predefined schema. This organization may enable efficient querying, indexing, and relationship mapping across fields. Non-limiting examples of structured databases 162 may include relational databases (e.g., PostgreSQL, MySQL), hybrid document-relational systems, and/or graph-based databases supporting schema validation and referential integrity. In an embodiment, the structured database 162 may define tables or collections for inquiry object 124 attributes, classification instances, filtering metadata, and synchronization logs. Each stored inquiry object 124 may maintain relational keys linking it to its corresponding taxonomy node, source identifier 160, and processing history, thereby enabling traceable and efficient retrieval by downstream modules. For purposes of this disclosure, "secure synchronization" refers to a process by which data stored within the structured database 162 are exchanged, mirrored, or updated across connected computing environments using encrypted communication channels and authentication protocols that preserve data integrity and confidentiality. In some embodiments, secure synchronization may be implemented using transport layer security (TLS), mutual authentication tokens, or OAuth-based credential exchange to authorize communication between internal and external systems. Synchronization events may occur continuously, in scheduled intervals and/or be triggered by specific workflow events such as the creation of a new filtered inquiry object 124 or modification of an existing record. In an embodiment, synchronization logic may include version control and change-tracking mechanisms that detect and resolve data conflicts to prevent duplication or loss during concurrent updates.

In further reference to FIG. 1, for purposes of this disclosure, an "external system" is any third-party or enterprise software platform that interfaces with the intake system for data exchange or workflow continuation. Non-limiting examples of external systems may include law firm case management systems, customer relationship management (CRM) platforms, document management tools, and/or legal analytics systems. In an embodiment, secure synchronization with external systems may be achieved through authenticated application programming interface (API) layers or webhook-based integration frameworks that support bidirectional communication. For example, once an inquiry object 124 passes the filtering stage and is classified as a valid client lead, at least a processor 108 may transmit its structured representation through API to the external CRM system, where it may automatically generate a new client profile, populate matter intake fields, or initiate human review workflows. For purposes of this disclosure, a "filtered set of inquiry objects" is the subset of inquiry objects that have successfully satisfied all filtering criteria. For example, filtering criteria including minimum confidence thresholds, data completeness requirements, and/or taxonomy node-specific rule set conditions. In an embodiment, the filtered set of inquiry objects 164 may thus represent validated, high-quality inquiries ready for storage, synchronization, and downstream operational use. In some embodiments, the filtered set of inquiry objects 164 may be serialized into a standard interchange format (e.g., JSON, XML, or Avro) and stored alongside associated metadata such as filtering timestamps, confidence values, and rule set identifiers. In an embodiment, at least a processor 108 may perform batch or real-time database writes through a transactional interface ensuring atomicity, consistency, isolation, and durability (ACID) properties. The structured database 162 may further employ indexing strategies, such as composite or semantic indices, to enable efficient retrieval by filtering criteria, node identifiers, and/or external synchronization status. In an embodiment, this architecture may ensure that validated intake data can be securely persisted, efficiently accessed, and seamlessly integrated into external workflows without compromising data security or traceability.

Still referring to FIG. 1, in an embodiment, at least a processor 108 may be configured to route a filtered set of inquiry objects 164 to an external processing pipeline 166. For purposes of this disclosure, an "external processing pipeline" is a connected computational or operational infrastructure that performs additional data transformation, enrichment, analysis, or workflow execution on the filtered inquiry objects 124 received from the intake system. In an embodiment, the external processing pipeline 166 may be implemented internally within a partner organization or externally within a third-party system. In some cases, the external processing pipeline 166 may be configured to extend or augment the functionality of the intake system by performing tasks such as lead scoring, case assignment, compliance verification, data normalization, and/or workflow orchestration across connected business systems. In some embodiments, routing to the external processing pipeline 166 may occur through an authenticated communication interface 172 or application programming interface (API) layer. At least a processor 108 may serialize each filtered inquiry object 124 into a standardized payload (e.g., JSON or Protobuf format) and transmit it using RESTful API calls, message queues (e.g., Kafka, RabbitMQ), or event-driven frameworks (e.g., AWS EventBridge, Azure Service Bus). In an embodiment, routing logic may include prioritization rules based on taxonomy node type, urgency score, and/or confidence weighting, ensuring that time-sensitive or high-value inquiries are transferred first. For example, an inquiry classified under the "Medical Malpractice" node with a high confidence score 136 may be routed immediately to a case review service, whereas lower-confidence or incomplete inquiries may be deferred or flagged for manual verification.

With further reference to FIG. 1, for purposes of this disclosure, "routing" refers to the systematic transfer of structured data objects between computational environments while maintaining schema integrity, version compatibility, and transactional reliability. In an embodiment, at least a processor 108 may execute routing operations using asynchronous job scheduling or concurrent threads to prevent performance bottlenecks during high-volume data transfer. Each routing event may generate a delivery receipt, transaction ID, and/or webhook callback confirming successful transfer, which may be logged in the structured database 162 for auditing and synchronization verification. In some embodiments, a retry mechanism may be implemented to ensure reliable message delivery, re-queuing failed transmissions until acknowledgment is received from the destination system. In an embodiment, the external processing pipeline 166 may include multiple modular components, such as data ingestion engines, validation models, and/or downstream analytics tools, that consume the routed inquiry objects 124. Each module within the pipeline may perform specialized functions, such as enriching the inquiry object 124 with third-party data (e.g., demographic or geographic metadata), performing advanced risk assessment using predictive models, and/or initiating automated notifications and workflow assignments for human review. In certain embodiments, the external processing pipeline 166 may also feed processed results back to the intake system through the same secure synchronization channel, enabling closed-loop data enrichment and continuous learning. This integration may ensure that classification accuracy, lead qualification, and case allocation processes remain dynamically optimized across both internal and external environments.

With continued reference to FIG. 1, in an embodiment, at least a processor 108 may be configured to generate a supplemental information request 168 as a function of filtering the accumulated set of inquiry objects 144. For purposes of this disclosure, a "supplemental information request" is a dynamically generated communication or digital artifact configured to solicit additional data from a user, client, or external system. In an embodiment, the supplemental information request 168 may function as an automated remediation mechanism within the intake pipeline, enabling system 100 to resolve data gaps, clarify ambiguous inputs, and/or validate inconsistent entries without requiring manual intervention by administrative staff. By doing so, system 100 may reduce intake latency and improve the overall completeness and quality of the structured data used for classification and routing. Non-limiting examples of supplemental information requests 168 may include, without limitation: (i) an email or SMS message prompting a client to provide missing jurisdiction or event date information; (ii) an in-app notification requesting document upload or clarification of incident details; and/or (iii) an automated webhook call to a third-party CRM or document management system requesting metadata completion for a case file. In some embodiments, the supplemental information request 168 may include structured data-attribute prompts derived from the inquiry object's schema, enabling precise targeting of missing or non-compliant fields. For example, if the filtering layer 142 identifies an incomplete "incident description" field within a "Personal Injury" inquiry object 124, system 100 may automatically generate a supplemental prompt such as "Please describe how and where the injury occurred."

In continued reference to FIG. 1, in an embodiment, the supplemental information request 168 may be generated by a request-generation module that interfaces with the filtering layer 142 and the communication interface 172. In an embodiment, at least a processor 108 may analyze the filtering results for each inquiry object 124, identify deficiencies or conflicts, and dynamically construct a corresponding request payload that specifies the missing fields, suggested response formats, and/or contextual information (e.g., associated taxonomy node, inquiry identifier, and priority level). In some embodiments, the supplemental requests may be generated using a template-based natural language generation (NLG) engine or a retrieval-augmented language model trained on historical intake communications to produce domain-appropriate, human-readable prompts. In an embodiment, system 100 may then route the request through one or more communication channels, such as email APIs, messaging queues, and/or user-facing web forms, ensuring delivery to the original source or associated user device that submitted the incomplete inquiry. This feedback-driven mechanism may enable the intake system to maintain data integrity and continuously refine inquiry completeness in a fully automated and scalable manner.

With further reference to FIG. 1, in an embodiment, the generation of supplemental information requests 168 may be facilitated or enhanced by one or more machine-learning models trained to identify missing, inconsistent, or incomplete data fields and to formulate contextually appropriate follow-up prompts. The inputs to such models may include structured metadata from the inquiry object 124 (e.g., taxonomy node, completeness indicators, filtering status, and confidence score 136), unstructured content features such as transcribed client statements or text submissions, and contextual parameters including communication channel and submission timestamp. In some embodiments, additional environmental signals, such as prior interaction history, client engagement frequency, or response latency, may also be incorporated to optimize timing and tone of supplemental outreach. The outputs of the model may include (i) one or more candidate prompts or request templates addressing the specific non-compliant fields, (ii) predicted response likelihoods or priority rankings for each candidate request, and (iii) structured payloads formatted for delivery through the system's communication interface 172. In an embodiment, training data for these models may include historical intake records annotated with field-level completion outcomes and associated communication transcripts or templates used by human intake specialists to request missing information. Such datasets may be sourced from internal intake system logs, CRM correspondence archives, and/or anonymized communication records from participating law firms. In some embodiments, the model may be fine-tuned using domain-specific corpora reflecting legal intake language, ensuring accurate terminology and professional tone. In an embodiment, the training process may involve supervised learning for classification of incomplete fields and sequence-to-sequence modeling for prompt generation. Reinforcement learning with human feedback (RLHF) may also be employed to optimize prompt clarity, brevity, and response rate, using client engagement metrics as the reward signal. In an embodiment, the models may include transformer-based architectures, such as encoder-decoder networks or retrieval-augmented generation (RAG) systems, trained on large-scale text data combined with structured schema annotations. Model retraining may occur periodically as new client interactions and request-response pairs are logged, allowing system 100 to learn evolving linguistic patterns and improve both the precision of missing-field detection and the quality of generated prompts. The resulting models may be containerized and deployed as microservices within the request-generation module, accessible through internal APIs for real-time inference. In an embodiment, this adaptive modeling framework may enable the intake system to intelligently detect deficiencies and autonomously generate targeted, domain-aligned requests that drive data completeness across the entire inquiry pipeline.

In further reference to FIG. 1, in an embodiment, generating the supplemental information request 168 may include identifying one or more inquiry objects 124 within the accumulated set of inquiry objects 144 that fail to satisfy a filtering condition 148. For purposes of this disclosure, a "filtering condition" is a logical, statistical, or rule-based criterion applied to each inquiry object 124 during the filtering process to determine whether the object possesses the minimum required completeness, consistency, and confidence necessary for advancement to downstream processing. In an embodiment, filtering conditions 148 may include both deterministic rules defined by system administrators and/or dynamic thresholds learned or adapted by the filtering layer 142's machine-learning models. In some embodiments, filtering conditions 148 may be expressed as declarative statements, Boolean expressions, and/or parameterized constraints associated with specific taxonomy nodes, such as "confidence_score≥0.85," "incident_date not null," or "jurisdiction matches recognized state entity." Non-limiting examples of filtering conditions 148 may include: (i) field completeness rules requiring that key attributes, such as client name, incident description, or date, be populated; (ii) consistency checks ensuring that numerical or categorical data align across related fields (e.g., matching zip code and state); and/or (iii) quality-based thresholds requiring that the weighted confidence score 140 meet or exceed a node-specific minimum. In an embodiment, the filtering layer 142 may store such filtering conditions 148 in a rule-definition database or configuration file, organized by taxonomy node or practice area. For instance, a "Medical Malpractice" node may enforce stricter conditions on confidence score 136 and narrative completeness, whereas an "Employment Dispute" node may emphasize time range and employer identification.

With continued reference to FIG. 1, in an embodiment, at least a processor 108 may evaluate each inquiry object 124 within the accumulated set against these filtering conditions 148 using a validation engine. In an embodiment, the validation engine may parse rule definitions, apply them sequentially or in parallel, and output a compliance vector or binary pass/fail result for each inquiry object 124. Inquiry objects 124 that fail one or more filtering conditions 148 may be flagged as non-compliant and queued for supplemental information request 168 generation. In an embodiment, at least a processor 108 may also log metadata describing which specific rules were violated, when the failure occurred, and which taxonomy node was affected. In some embodiments, the validation engine may interface with a monitoring submodule configured to analyze filtering-condition failure patterns over time, providing diagnostic insight into recurring data gaps or systemic intake issues. This process may ensure that only inquiries meeting the system's completeness and reliability standards progress downstream, while those that do not are automatically identified for corrective follow-up through the supplemental information request 168 pipeline.

In continued reference to FIG. 1, in an embodiment, identification of inquiry objects 124 that fail to satisfy one or more filtering conditions 148 may be supported or automated by one or more machine-learning models trained to predict data completeness, detect inconsistency patterns, and/or flag anomalous entries within the accumulated set of inquiry objects 144. The inputs to such models may include, without limitation, structured metadata fields, such as taxonomy node identifiers, confidence scores 136, field population indicators, timestamps, and prior filtering outcomes, as well as unstructured features extracted from text-based representations 154 of the inquiry object 124 (e.g., token embeddings, syntactic patterns, or semantic similarity metrics). In some embodiments, contextual signals such as source channel (e.g., web, audio, or email), submission sequence order, and/or interaction frequency may also serve as model inputs to capture behavioral cues indicative of incomplete or erroneous submissions. In an embodiment, the outputs of the models may include, without limitation, binary or probabilistic indicators representing whether a given inquiry object 124 satisfies its corresponding filtering condition 148, as well as diagnostic tags identifying which data fields or schema elements are likely to be non-compliant. In an embodiment, without limitation, training data for these models may include labeled datasets of historical inquiry objects 124 annotated with their compliance outcomes, such as "complete," "incomplete," "inconsistent," or "missing critical data." These datasets may be sourced from prior intake cycles, human-reviewed validation logs, and/or system-generated audit trails that record field-level completion statuses and filtering results. In some embodiments, additional training data may be drawn from integration with external systems (e.g., CRM or case management platforms) that record post-intake corrections or client follow-up interactions, allowing the models to learn patterns associated with data deficiencies and subsequent remediation. In an embodiment, the models may be trained using supervised or semi-supervised learning methods, employing objective functions such as binary cross-entropy, F1 optimization, or anomaly-detection loss.

With further reference to FIG. 1, in an embodiment, the models may utilize architectures suited to mixed data modalities, such as multi-layer perceptrons for tabular features or transformer-based encoders for text-based completeness assessment. In an embodiment, model retraining may occur continuously or periodically using newly labeled data generated as the system operates, enabling ongoing adaptation to shifting user behaviors, communication formats, and inquiry complexity. In some embodiments, reinforcement learning or self-training approaches may be used to refine decision boundaries based on downstream feedback from the supplemental information request 168 module, such as whether a request successfully resolved a previously flagged data deficiency. This feedback-driven learning loop allows system 100 to evolve its definition of "sufficient completeness" dynamically, improving both precision and recall in identifying inquiry objects 124 that require supplemental data collection.

Still referring to FIG. 1, in an embodiment, generating the supplemental information request 168 may include determining, for each inquiry object 124 of the one or more inquiry objects 124, at least one non-compliant data field 150. For purposes of this disclosure, a "non-compliant data field" refers to any data attribute or schema element within an inquiry object 124 that fails to meet one or more validation, completeness, or consistency requirements defined by the filtering layer 142 or associated rule sets. In an embodiment, a data field may be deemed non-compliant when it is missing, partially populated, internally inconsistent with other fields, and/or contains content that fails to conform to expected data formats, value ranges, or ontology constraints. Non-compliance may also be determined contextually, such as when a field's value conflicts with domain-specific rules for a given taxonomy node. For example, a "Personal Injury" inquiry object 124 may include a populated "incident description" but an empty "date of injury" field, or a "Contract Review" inquiry may include an uploaded document but no specified jurisdiction, both of which would render those fields non-compliant under the applicable rule set. In an embodiment, at least a processor 108 may analyze each inquiry object 124 to identify and flag non-compliant data fields using both deterministic validation logic and learned anomaly detection models. In some cases, deterministic validation may involve verifying field-level constraints such as data type (e.g., string, numeric, date), regular expression matching (e.g., proper email or phone number formats), and presence of required fields based on the associated taxonomy node. Learned detection models, on the other hand, may infer non-compliance from contextual cues, such as unusually short text responses, improbable date intervals, and/or inconsistent semantic relationships between fields. For example, if a client provides "April 2026" as an incident date but indicates the case was "already settled," the model may detect temporal inconsistency and flag the relevant fields for clarification.

With continued reference to FIG. 1, in an embodiment, system 100 may represent field-level compliance as a binary or continuous-valued compliance vector, where each element corresponds to a specific data field and indicates its compliance state (e.g., 1=compliant, 0=non-compliant). In an embodiment, at least a processor 108 may compute this vector by iterating through the inquiry object's schema and applying a series of field-specific validation functions. In some embodiments, the compliance vector may also include confidence scores 136 or severity weights reflecting the estimated importance or likelihood of each non-compliance event. These vectors may then be stored as appended instances within the inquiry object 124, enabling traceability of detected deficiencies over time and across model iterations. In an embodiment, at least a processor 108 may further prioritize non-compliant fields for remediation based on their relevance to the taxonomy node, historical correction success rate, or impact on downstream processing accuracy. This structured identification and prioritization process may ensure that supplemental information requests 168 target only the most critical data gaps, thereby improving both response efficiency and overall data integrity within the intake pipeline.

In continued reference to FIG. 1, in an embodiment, generating the supplemental information request 168 may include selecting, as a function of the at least a taxonomy node 132 of the plurality of taxonomy nodes 134 and the at least one non-compliant data field 150, one or more data-attribute prompts 170. For purposes of this disclosure, a "data-attribute prompt" is a structured or semi-structured query, instruction, or message generated by the system to solicit specific information corresponding to a missing, incomplete, or inconsistent data field within an inquiry object 124. In an embodiment, each data-attribute prompt may be contextually tailored according to the taxonomy node associated with the inquiry object 124 and the semantic meaning of the deficient field, ensuring that requests are relevant, interpretable, and aligned with domain-specific terminology. Non-limiting examples of data-attribute prompts may include, without limitation: (i) a targeted question requesting clarification for a missing field (e.g., "Please provide the date when the incident occurred" for a "Personal Injury" node); (ii) a contextual verification request ("You indicated that the incident took place in Boston, please confirm the jurisdiction for this matter"); or (iii) an adaptive follow-up prompt based on user response history ("Would you like to upload supporting documentation or provide a brief written summary?"). In some embodiments, the data-attribute prompt may include response-type indicators (e.g., free-text, multiple-choice, file upload), expected data formats (e.g., ISO date, state abbreviation), and/or examples of acceptable responses, enabling the communication interface 172 to dynamically render appropriate input elements for the user or external system.

With continued reference to FIG. 1, in an embodiment, at least a processor 108 may select or generate one or more data-attribute prompts 170 using a prompt-generation engine that references a structured prompt library or dynamically composes text based on learned associations between taxonomy nodes, data fields, and linguistic templates. In an embodiment, the prompt library may be organized as a relational mapping table linking field identifiers (e.g., "incident_date," "jurisdiction," "employer_name") to preapproved prompt templates, each parameterized for insertion of taxonomy-specific terminology. For example, the "Employment Dispute" node may reference templates such as "Please specify your employer's name" or "When did the issue with unpaid wages begin?", while the "Medical Malpractice" node may reference "Please provide the name of the treating physician or facility." In some embodiments, the selection or generation of data-attribute prompts may be enhanced using natural language processing (NLP) or retrieval-augmented generation (RAG) models trained on historical client communications and prior supplemental request-response pairs. In an embodiment, the inputs to these models may include the non-compliant field identifier, taxonomy node, prior inquiry context, and metadata describing user language preferences or communication channel. The outputs may include, without limitation, one or more ranked prompt candidates, each scored by predicted response clarity or likelihood of user engagement. In an embodiment, training data for such models may be sourced from historical intake logs, prior supplemental requests, and/or feedback data indicating which prompts successfully elicited responses. Reinforcement learning techniques may further refine the prompt selection process by using completion rates and/or client satisfaction scores as reward signals. This adaptive, domain-specific approach may ensure that data-attribute prompts remain both contextually precise and linguistically optimized to elicit accurate, actionable responses across diverse intake environments.

With further reference to FIG. 1, in an embodiment, generating the supplemental information request 168 may include transmitting, using a communication interface 172, the one or more data-attribute prompts 170 to a source of the at least one input data stream 173. For purposes of this disclosure, a "communication interface" refers to a software or hardware subsystem configured to facilitate secure, bidirectional data exchange between the intake system and one or more external entities. In an embodiment, the communication interface 172 may implement one or more communication protocols, such as HTTP(S), WebSocket, SMTP, RESTful APIs, or message queuing services, to enable the reliable delivery and acknowledgment of transmitted data-attribute prompts. In some embodiments, the communication interface 172 may further include encryption modules, authentication layers, and retry mechanisms to ensure the integrity, confidentiality, and successful receipt of transmitted requests across distributed networks. For purposes of this disclosure, a "source" is the origin or generating entity associated with a given input data stream. In an embodiment, the source may include human users (e.g., prospective clients submitting inquiry data), automated data ingestion services, and/or external platforms that supply structured or unstructured content to the intake system. Non-limiting examples of sources may include: (i) a web form submission portal; (ii) a telephony or voice interface that provides audio data streams 152 from recorded client calls; (iii) an email server or CRM integration that captures text-based correspondence; and/or (iv) a document management system providing metadata about uploaded files. In an embodiment, each source may be uniquely identified by a source identifier 160 embedded within the input data stream, enabling system 100 to route supplemental information requests 168 back to the correct origin.

In further reference to FIG. 1, in an embodiment, when a supplemental information request 168 is generated, at least a processor 108 may invoke the communication interface 172 to assemble a transmission payload including one or more data-attribute prompts 170, metadata describing the inquiry object 124, and routing information identifying the appropriate source. For example, if the source is a web-based intake form, the communication interface 172 may issue an API call that dynamically populates additional form fields within the user's browser session. If the source is an email system, the communication interface 172 may generate an outbound email containing embedded prompts or secure links to a response portal. In some embodiments, the communication interface 172 may operate asynchronously, queuing requests in a message broker system until the source confirms readiness to receive updates. In an embodiment, at least a processor 108 may monitor transmission events and maintain communication logs, storing timestamps, delivery statuses, and acknowledgments for auditing and synchronization purposes. In an embodiment, the communication interface 172 may further support channel-specific adapters that translate generic data-attribute prompts into channel-appropriate formats, such as JSON for APIs, MIME for emails, or XML for enterprise middleware. In some embodiments, the communication interface 172 may incorporate an orchestration engine that prioritizes transmissions based on urgency, taxonomy node type, and/or user engagement probability. Additionally, system 100 may include inbound-handling capabilities, allowing user responses received through the same interface to be automatically parsed, validated, and re-integrated into the corresponding inquiry object 124. This closed-loop feedback mechanism may ensure continuity between the generation of supplemental requests and the resolution of data deficiencies, maintaining the integrity, accuracy, and timeliness of client intake data across multiple communication channels.

Still referring to FIG. 1, in an embodiment, at least a processor 108 may be configured to monitor, using a detection layer 174, the plurality of input data streams 121 for a source identifier 160 associated with the inquiry object 124. For purposes of this disclosure, a "detection layer" is a computational subsystem or modular architecture configured to continuously or periodically analyze incoming data streams to identify, match, or correlate data artifacts associated with existing inquiry objects 124. In an embodiment the detection layer 174 may operate as an event-driven monitoring engine that enables system 100 to recognize new or updated data originating from a common source, such as a follow-up email, an uploaded document, and/or an additional voice submission, and automatically associate it with the corresponding inquiry object 124. This capability may ensure that multi-channel, asynchronous user interactions are consolidated under a unified data structure, maintaining continuity across ongoing client communications and reducing redundancy within the intake pipeline.

In continued reference to FIG. 1, in an embodiment, the detection layer 174 may receive as input a plurality of raw or preprocessed data streams, each including structured and/or unstructured data, a source identifier 160, and/or accompanying metadata such as timestamp, channel type, and/or taxonomy context. In an embodiment, the detection layer 174 may output one or more detection events, structured records indicating that a match or correlation has been identified between an input data stream and an existing inquiry object 124. Each detection event may include the unique inquiry object 124 identifier, source identifier 160, and/or a confidence metric representing the degree of match between the input data and stored record. Non-limiting examples of detection layer 174 operations may include: (i) identifying that a client's second voice message corresponds to an existing inquiry previously submitted via web form; (ii) detecting that an uploaded image or document is associated with a specific case file based on embedded metadata; and/or (iii) recognizing a subsequent text submission from the same phone number or email address as an existing client inquiry. In an embodiment, the detection layer 174 may include one or more submodules such as a correlation engine, a feature extraction module, and/or a matching model. The correlation engine may compare source identifiers 160 across incoming and stored data streams, while the feature extraction module may derive semantic or statistical representations (e.g., embeddings or hash signatures) for fuzzy matching when identifiers differ slightly across channels. In an embodiment, the matching model may utilize heuristic thresholds, similarity metrics (e.g., cosine similarity, Jaccard index), and/or machine-learning classifiers trained to predict likelihood of association based on metadata and content similarity. The detection layer 174 may interface with both the structured database 162 and communication interface 172, allowing it to retrieve reference records for comparison and to trigger downstream actions, such as inquiry object 124 modification, reclassification, and/or supplemental information acknowledgment, when new correlated data are detected.

With continued reference to FIG. 1, in an embodiment, at least a processor 108 may be configured to modify the inquiry object 124 as a function of detecting the source identifier 160 in at least one input data stream 120 of the plurality of input data streams 121. In an embodiment, modifying the inquiry object 124 may refer to the process of updating, enriching, and/or augmenting the stored representation of an inquiry object 124 when new or revised information is detected from a data stream originating from the same source. Modification may include merging newly received data fields, updating previously incomplete or incorrect entries, and/or appending additional metadata or communication artifacts such as transcriptions, file attachments, or timestamps. In an embodiment, this process may ensure that the inquiry object 124 remains a living, continuously synchronized record of all relevant interactions and submissions associated with a given source or client. In an embodiment, upon detecting a source identifier 160 match, the detection layer 174 may trigger a modification event that passes the correlated data payload to at least a processor 108 for integration. In an embodiment, at least a processor 108 may parse the new input data stream, identify which schema fields overlap with existing inquiry object 124 attributes, and determine whether to overwrite, append, or reconcile the new information based on predefined update policies. For example, if a client's original submission included only a brief description of an incident and the subsequent email provides additional details such as location or date, system 100 may append those fields to the existing record while preserving the prior data instance for audit traceability. Conversely, if conflicting information is received, such as two differing incident dates, at least a processor 108 may invoke the system's conflict-resolution logic, as described in earlier sections, to determine which value to retain based on recency, source confidence, or historical correction patterns.

Still referring to FIG. 1, in an embodiment, the modification process may occur within a controlled update pipeline that enforces atomicity and versioning for every modification to an inquiry object 124. In an embodiment, each modification event may generate a new version of the inquiry object 124 stored as a discrete record, maintaining immutable references to prior versions for traceability and rollback. At least a processor 108 may, in some cases, employ schema validation and data integrity checks before committing updates to the structured database 162, ensuring that no modification introduces structural inconsistencies or violates schema constraints. In some embodiments, system 100 may assign a modification confidence score 136, derived from the detection event's confidence metric and contextual parameters (e.g., data freshness or source reliability), to qualify the trustworthiness of the change. Additionally, the modification process may include triggering downstream synchronization events, ensuring that updated inquiry objects 124 are propagated to any connected external systems or pipelines. In an embodiment, the communication interface 172 may transmit notification payloads, such as "update available" messages or webhook signals, to external CRM or case management systems subscribed to the affected records. In some embodiments, the modification pipeline may also interact with the reinforcement-learning subsystem, logging modification outcomes and user corrections as training data for continuous model improvement. This approach may ensure that system 100 remains adaptive, enabling automated intake records to evolve accurately and efficiently as new client data are received across multiple communication channels.

With further reference to FIG. 1, in an embodiment, the detection layer 174 and modification pipeline may each incorporate one or more machine-learning models trained to identify correlation patterns among input data streams and to determine optimal modification actions for associated inquiry objects 124. The inputs to these models may include, without limitation, structured metadata such as source identifiers 160, timestamps, taxonomy node identifiers, channel types, and classification confidence scores 136, as well as unstructured or semi-structured data elements extracted from the data streams, including transcribed text, document content, or semantic embeddings generated by prior language-processing modules. Additional contextual features, such as frequency of user submissions, communication intervals, or historical correction outcomes, may also serve as model inputs to improve detection precision and modification decisioning. In an embodiment, the outputs of the detection models may include, without limitation, binary or probabilistic indicators representing whether an incoming data stream corresponds to an existing inquiry object 124, while the outputs of the modification models may specify the scope and type of update, such as field-level replacement, append, merge, or flag-for-review actions, accompanied by a modification confidence value. In an embodiment, training data for these models may be derived from annotated historical intake events and prior modification logs captured by the system. For example, data showing which subsequent client messages successfully matched existing inquiries may be labeled as positive correlation examples, while unmatched or erroneous associations may serve as negative samples. Similarly, modification models may be trained using sequences of inquiry object 124 versions annotated with the ground-truth updates performed by human reviewers or verified external systems. In an embodiment, these training datasets may be sourced from internal operational databases, CRM system integration logs, and/or synthetic datasets generated through controlled simulations of multi-source data ingestion.

In continued reference to FIG. 1, in an embodiment, the detection models may employ ensemble architectures that combine rule-based similarity metrics (e.g., Levenshtein distance, cosine similarity of embeddings) with supervised classifiers such as logistic regression, random forests, or transformer-based encoders fine-tuned for cross-source matching. In an embodiment, the modification models may utilize decision networks and/or reinforcement-learning agents trained to optimize update actions based on downstream accuracy feedback and user corrections. The learning objective for both model types may include minimizing false matches while maximizing data completeness and integrity across iterative updates. In an embodiment, model retraining may occur continuously through an adaptive learning pipeline that incorporates new labeled events, such as successful source correlations, modification approvals, or user-submitted corrections, into the training dataset. The retraining process may use distributed training infrastructure and maintain version control to allow comparison of successive model generations. In some embodiments, active learning may be employed, wherein system 100 automatically flags uncertain or low-confidence detections for human validation, incorporating reviewer feedback into subsequent training cycles. This continuous feedback and retraining mechanism may allow both the detection layer 174 and modification pipeline to improve over time, ensuring increasingly accurate identification of multi-source data relationships and precise, context-aware modification of inquiry objects 124 across evolving client interaction patterns.

In further reference to FIG. 1, in an embodiment, at least a processor 108 may be configured to synchronize, using an authenticated application programming interface (API) layer, the filtered set of inquiry objects 164 with one or more external systems 177. For purposes of this disclosure, an "application programming interface (API) layer" is a software-based communication interface 172. In an embodiment, the API layer 176 may include one or more endpoint definitions, authentication mechanisms, and transmission protocols that enable controlled, structured exchange of data between the present intake system and external systems. In an embodiment, the API layer 176 may serve as a secure synchronization conduit, allowing validated inquiry objects 124 to be transmitted, updated, or retrieved in a standardized format while preserving data integrity, version traceability, and access control. In some embodiments, the API layer 176 may be implemented as a RESTful or GraphQL service, exposing structured endpoints for inquiry object 124 creation, update, and retrieval operations. In an embodiment, the API layer 176 may also include middleware components for request validation, rate limiting, session management, and data transformation. For purposes of this disclosure, "synchronization" refers to the process of ensuring that the filtered set of inquiry objects 164 maintained within the system's structured database 162 is accurately mirrored or propagated to connected external systems. Synchronization may occur in real time, triggered by modification or classification events, or in batch intervals defined by administrative or policy constraints. In an embodiment, each synchronization transaction may involve serializing inquiry object 124 data into a transmission-ready format (e.g., JSON, XML, or Protobuf), generating a request payload containing relevant metadata (such as object identifier, timestamp, and taxonomy node), and sending it through the API layer 176 to one or more registered endpoints. Non-limiting examples of external systems may include customer relationship management (CRM) software, case management databases, analytics dashboards, and document management platforms. In an embodiment, the API layer 176 may include an authentication subsystem configured to verify the identity and authorization level of any requesting or receiving entity before data exchange occurs. In an embodiment, authentication mechanisms may include API keys, OAuth 2.0 tokens, mutual TLS certificates, or SAML assertions, depending on the integration requirements of the connected system. Once authenticated, the API layer 176 may initiate bidirectional communication to support both outbound synchronization (e.g., pushing updated inquiry objects 124 to external systems) and inbound synchronization (e.g., receiving case resolution data for use in model retraining). In an embodiment, at least a processor 108 may maintain synchronization logs that record each transaction's unique identifier, timestamp, status code, and error details, allowing full traceability and auditing of all API interactions.

With continued reference to FIG. 1, in an embodiment, the API layer 176 may also include schema mapping and validation logic to ensure compatibility between the internal data model of the inquiry object 124 and the target schema of the external system. For example, a "jurisdiction" field internally represented as a text string may be mapped to a standardized enumeration in the external CRM system. In some embodiments, a synchronization scheduler or message broker may be integrated with the API layer 176 to queue and manage synchronization events asynchronously, ensuring consistent throughput even under high system load. In an embodiment, this authenticated API-based synchronization architecture may enable secure, reliable, and scalable integration of the intake system with external enterprise platforms, thereby maintaining cross-system consistency and supporting automated workflow continuity.

Still referring to FIG. 1, in an embodiment, at least a processor 108 may be configured to encrypt the filtered set of inquiry objects 164 transmitted through the authenticated API layer 176 using an encryption protocol 178. For purposes of this disclosure, an "encryption protocol" is a cryptographic framework that defines the algorithms, key exchange mechanisms, and data-handling procedures used to convert plaintext data into ciphertext to prevent unauthorized access or interception during transmission or storage. In an embodiment, encryption protocols 178 may be employed at both the transport and application layers, ensuring that the filtered set of inquiry objects 164 remains secure end-to-end throughout the synchronization process. Non-limiting examples of encryption protocols 178 suitable for implementation in the present system may include Transport Layer Security (TLS 1.3), Advanced Encryption Standard (AES-256), Rivest-Shamir-Adleman (RSA) encryption, or Elliptic Curve Cryptography (ECC)-based algorithms. In an embodiment, transport-layer encryption may be applied automatically as data packets traverse network channels between the system and one or more external systems 177 connected through the API layer 176. The API layer 176 may enforce TLS encryption to ensure that all API requests and responses are protected from eavesdropping or man-in-the-middle attacks. In an embodiment, session keys may be dynamically generated using an asymmetric key exchange protocol (e.g., Diffie-Hellman or Elliptic Curve Diffie-Hellman) and rotated periodically to maintain session-level confidentiality. In some embodiments, additional application-layer encryption may be applied to individual inquiry objects 124 or data fields prior to serialization and transmission. For example, personally identifiable information (PII), such as client name, email address, or contact number, may be encrypted using AES with a unique symmetric key derived for each transaction.

With further reference to FIG. 1, in an embodiment, the encryption subsystem may further incorporate a key management module responsible for generating, distributing, storing, and retiring cryptographic keys. In an embodiment, keys may be stored in a hardware security module (HSM) or other FIPS-compliant key vault, accessible only to authorized processes within the system. Key management operations may follow role-based access control policies, ensuring that encryption and decryption privileges are strictly segregated. In some embodiments, at least a processor 108 may apply a hybrid encryption scheme, wherein small metadata payloads (e.g., schema descriptors or identifiers) are encrypted using asymmetric algorithms, while large data payloads (e.g., serialized inquiry objects 124) are encrypted using faster symmetric ciphers. In an embodiment, the encryption protocol 178 may also support data integrity verification by generating cryptographic hashes (e.g., SHA-256 or SHA-3) for each transmitted payload. These hash values may be appended as digital signatures or message authentication codes (MACs) to allow the receiving system to confirm that the data were not altered in transit. In certain embodiments, the encryption subsystem may also integrate with the authentication mechanisms of the API layer 176 to provide mutual verification of endpoints, ensuring that both sender and receiver are trusted entities prior to data exchange. In an embodiment, encryption operations may be performed asynchronously, allowing at least a processor 108 to queue encrypted payloads for transmission without impeding the system's intake or classification performance. In some cases, a decryption routine implemented within the receiving external system may be required to restore the original content of the inquiry object 124, provided the appropriate keys and credentials are verified. Together, these encryption and authentication mechanisms may ensure that the filtered set of inquiry objects 164 transmitted through the API layer 176 remain confidential, tamper-resistant, and compliant with data privacy regulations such as GDPR, HIPAA, or SOC 2.

With continued reference to FIG. 1, in an embodiment, encrypted inquiry objects 124 transmitted through the authenticated application programming interface (API) layer may undergo serialization, storage, and post-transmission integrity verification to ensure reliable synchronization across external systems. For purposes of this disclosure, "serialization" refers to the process of converting a structured digital object into a compact, transferable representation that preserves both hierarchical relationships and schema metadata. In an embodiment, prior to encryption, at least a processor 108 may serialize each inquiry object 124 along with contextual identifiers, such as object ID, source identifier 160, taxonomy node, and encryption metadata. These serialized records may be encapsulated within a transmission envelope containing cryptographic headers (e.g., initialization vectors, algorithm descriptors, and hash digests) necessary for decryption and validation by the receiving system. Upon receipt, the external system may initiate a decryption and verification sequence that includes key retrieval from an authorized key vault, symmetric or asymmetric decryption of the payload, and hash-based validation of message integrity. In an embodiment, the integrity verification step may involve computing a cryptographic checksum, such as a SHA-256 or SHA-3 digest, over the decrypted payload and comparing it with the original signature embedded within the message envelope. In an embodiment, a match may confirm that the inquiry object 124 was not altered during transmission, while a mismatch may trigger a secure retry or rejection process. The receiving endpoint may log the verification outcome, including transaction ID, timestamp, and validation result, for auditability and compliance purposes.

In further reference to FIG. 1, in some embodiments, encrypted inquiry objects 124 that fail verification or decryption may be redirected into a quarantine buffer or error-handling pipeline. In an embodiment, this subsystem may isolate corrupted or incomplete payloads and flag them for automated re-transmission, re-encryption, or manual review. In an embodiment, at least a processor 108 may maintain redundancy through checkpointing mechanisms, for example, creating versioned local snapshots of serialized inquiry objects 124 prior to transmission. These checkpoints may allow recovery and re-synchronization without data loss if a network or decryption failure occurs. In an embodiment, system 100 may further include a storage verification module that periodically audits encrypted records retained within the structured database 162 or the external system's datastore to ensure ongoing consistency between stored and transmitted versions. This module may employ hash-chain verification, timestamp validation, and random sampling of archived records to detect silent corruption or tampering. In some embodiments, a blockchain-based proof-of-existence ledger may be optionally integrated to record cryptographic digests of each successfully transmitted inquiry object 124, thereby providing immutable confirmation of data authenticity and synchronization history. Through these combined serialization, encryption, verification, and recovery mechanisms, system 100 may ensure that each transmitted inquiry object 124 maintains structural integrity, authenticity, and continuity across distributed systems, even in the presence of intermittent communication failures or potential security threats.

In continued reference to FIG. 1, in an embodiment, at least a processor 108 may be configured to receive, from one or more external systems 177, outcome data 180 associated with the inquiry object 124. For purposes of this disclosure, "outcome data" is a structured or semi-structured set of records representing the eventual disposition, performance metrics, or downstream results corresponding to an inquiry object 124 that has previously been classified, filtered, or synchronized through the system. In an embodiment, outcome data 180 may include, but is not limited to, case resolution status (e.g., accepted, declined, referred, or retained), case type confirmation, client engagement outcomes, resolution duration, financial metrics (e.g., case value, settlement amount, or acquisition cost), and/or user-level quality indicators such as conversion rate, client satisfaction, and communication latency. In an embodiment, outcome data 180 may be received from one or more external systems 177 connected through the authenticated application programming interface (API) layer. Non-limiting examples of such external systems may include law firm case management systems, customer relationship management (CRM) platforms, document management databases, and billing or analytics dashboards. In an embodiment, each external system may produce a data feed containing fields that correspond to one or more inquiry objects 124, such as a unique inquiry identifier, classification result, or timestamp. System 100 may correlate these records to previously stored inquiry objects 124 using mapping logic implemented within the detection layer 174 or correlation engine. In an embodiment, outcome data 180 may be transmitted as periodic synchronization batches or real-time event streams, depending on the configuration of the integration endpoints. In some embodiments, the API layer 176 may employ webhooks, message queues (e.g., Kafka, RabbitMQ), or streaming data protocols (e.g., gRPC or WebSockets) to ensure low-latency and reliable ingestion of outcome records. Upon receipt, at least a processor 108 may validate the integrity and completeness of each outcome data instance by verifying schema conformity, checking field-level constraints (e.g., valid case ID or non-null resolution status), and comparing timestamps against system logs to ensure temporal consistency. In an embodiment, outcome data 180 may serve as the principal feedback signal enabling the system's adaptive learning cycle. By linking real-world outcomes to prior classifications, confidence scores 136, and filtering decisions, system 100 can quantify predictive performance and identify systematic biases or inefficiencies in its intake process. In this way, outcome data 180 may function as the "ground truth" that anchors subsequent reinforcement learning operations and informs recalibration of classification thresholds, taxonomy weightings, and other adaptive parameters described in further detail below.

With further reference to FIG. 1, in an embodiment, at least a processor 108 may be configured to generate a performance dataset 182 as a function of the outcome data 180 and inquiry object generation metadata 184. For purposes of this disclosure, a "performance dataset" is an aggregated and structured body of data that captures relationships between the system's intake predictions and the corresponding real-world results derived from external systems. In an embodiment, the performance dataset 182 may serve as a central analytic repository that enables quantitative assessment of model behavior, classification accuracy, filtering precision, and end-to-end intake efficiency. In an embodiment, the performance dataset 182 may include paired records linking each inquiry object's predicted attributes (e.g., taxonomy node, confidence score 136, weighted confidence score 140, or filter disposition) with its associated outcome data 180 (e.g., retained case status, referral source, or resolution quality metric). Each record within the performance dataset 182 may further include inquiry object generation metadata 184, which as used herein refers to contextual information describing how the inquiry object 124 was created, including but not limited to: data stream source (audio, email, form submission, or live chat), timestamp of intake, preprocessing transformations applied (e.g., speech-to-text conversion or schema mapping), classification layer 130 version, and/or model configuration parameters active at the time of classification. Together, these metadata fields may allow system 100 to reconstruct historical inference contexts and evaluate how variations in model versions or input modalities affect predictive performance.

In further reference to FIG. 1, in some embodiments, generating the performance dataset 182 may include normalizing heterogeneous data sources into a unified schema. For example, outcome data 180 received from different case management or CRM platforms may vary in structure, label conventions, or encoding formats. In an embodiment, at least a processor 108 may employ a schema harmonization process that maps these disparate fields into a common performance ontology, enabling statistical comparison and machine-learning analysis. The resulting performance dataset 182 may therefore include tabular data, event logs, and/or serialized vector embeddings, depending on the analytical operations to be performed downstream. In an embodiment, system 100 may periodically generate and update the performance dataset 182 at scheduled intervals (e.g., daily, weekly) or upon receiving new outcome data 180. Incremental updates may be achieved through delta ingestion techniques, where only new or modified outcome records are appended, and the corresponding inquiry object 124 instances are cross-referenced. In an embodiment, at least a processor 108 may compute derived performance indicators such as true-positive rate, false-positive rate, precision, recall, and F1 score for each taxonomy node or filter condition. In some embodiments, longitudinal tracking of these indicators may enable drift detection, identifying when model performance deviates due to shifting data distributions, seasonal variations, or emerging case types. In an embodiment, the performance dataset 182 may serve as the training substrate for the reinforcement learning model 186 described below. System 100 may, in some cases, use the performance dataset 182 to derive state-action-reward relationships, where each inquiry classification (action) and its subsequent outcome (reward) form the basis for policy optimization. By continuously regenerating and refining the performance dataset 182, system 100 may create a self-improving feedback loop that ensures the classification and filtering models evolve to reflect real-world intake outcomes, thereby improving efficiency and predictive fidelity over time.

Still referring to FIG. 1, in an embodiment, at least a processor 108 may be configured to update, using a reinforcement learning ("RL") model 186, one or more system parameters 188 as a function of the performance dataset 182. For purposes of this disclosure, a "reinforcement learning model" is a machine-learning framework that learns optimal decision-making policies through iterative interaction with an environment, where feedback signals guide model adaptation. In an embodiment, the environment may include the end-to-end intake pipeline, including the classification layer 130, filtering layer 142, and external systems producing outcome data 180. The RL model 186 may continuously refine system parameters, such as classification thresholds, taxonomy node weightings, and/or filtering rule priorities, to improve long-term intake accuracy and efficiency based on empirical performance observed through the performance dataset 182. In an embodiment, the RL model 186 may receive as input a set of feature representations derived from the performance dataset 182. In an embodiment, these features may include quantitative measures such as prior confidence scores 136, weighted confidence scores 140, feature embeddings corresponding to inquiry object 124 attributes, taxonomy node identifiers, and/or outcome metrics such as case acceptance or rejection. The RL model 186 may generate, as output, updated policy parameters and/or adjustment coefficients that directly modify the operational behavior of one or more system modules. For example, the RL model 186 may output a revised classification threshold for a specific taxonomy node, a reweighting coefficient that adjusts confidence score 136 computation, or a dynamic filter priority that determines which inquiries are forwarded to external pipelines.

In continued reference to FIG. 1, in an embodiment, the RL model 186 may employ a policy-based, value-based, or hybrid learning approach depending on system complexity and the temporal dependencies among classification and outcome events. In a policy-based embodiment (e.g., Proximal Policy Optimization (PPO)), the model may learn a continuous policy function that maps intake context vectors to optimal parameter adjustment actions. In a value-based embodiment (e.g., Deep Q-Network (DQN)), the model may estimate the expected reward associated with each possible configuration of system parameters and select the configuration that maximizes long-term return. In some embodiments, a hybrid approach combining actor-critic architectures may be implemented to stabilize learning across large and heterogeneous intake datasets. The reward function used to train the RL model 186 may be derived from key performance indicators computed within the performance dataset 182, such as classification accuracy, referral quality, conversion efficiency, or reduction in false positives. In some embodiments, the reward may be formulated as a composite metric that balances precision and recall or weights outcomes by business value or case importance. For example, correctly classifying a high-value or urgent inquiry may yield a higher positive reward, whereas misclassifying a viable lead as a disqualified inquiry may incur a negative penalty. In an embodiment, the RL model 186 may iteratively update its internal parameters to maximize cumulative reward, thereby aligning its decision policy with real-world operational goals.

With further reference to FIG. 1, in an embodiment, the training process for the RL model 186 may be implemented on distributed computing infrastructure, enabling large-scale simulation of intake events and parallelized parameter updates. In an embodiment, the model may be trained in a continuous learning loop where new performance data are periodically ingested, evaluated, and used to refine policy weights. In some embodiments, off-policy learning may be employed, allowing the RL model 186 to learn from historical data collected through prior configurations rather than requiring live interaction during every training cycle. In an embodiment, system 100 may also include a validation subroutine that tests updated parameters against a held-out subset of the performance dataset 182 before deployment, ensuring that modifications yield measurable improvements without destabilizing production behavior. In an embodiment, once new system parameters are validated, at least a processor 108 may propagate these updates across the classification layer 130 and filtering layer 142 through a configuration management interface. In an embodiment, one or more system parameters 188 may be versioned and time-stamped to maintain traceability and support rollback in the event of regression. In certain embodiments, the RL model 186 may further interact with a monitoring dashboard that visualizes reward trends, accuracy metrics, and policy evolution, enabling administrators to audit and interpret the system's adaptive behavior over time. Collectively, this closed-loop reinforcement mechanism may ensure that the intake platform continually learns from real-world outcomes, dynamically recalibrating its classification and filtering logic to maintain optimal performance across diverse intake conditions and evolving data distributions.

With continued reference to FIG. 1, in an embodiment, the one or more system parameters 188 updated by the reinforcement learning model 186 may be persisted, validated, and version-controlled to ensure consistent operation and traceable evolution of the system. For purposes of this disclosure, a "system parameter" is a configurable variable, coefficient, threshold, or model weight that influences the behavior of a component or module within the multi-modal intake architecture. Non-limiting examples of system parameters may include: classification thresholds used to determine whether an inquiry object 124 exceeds a minimum confidence score 136; weighting coefficients applied to node-specific attributes; rule-set sensitivity values used by the filtering layer 142 to identify disqualified inquiries; and feature scaling constants applied during schema normalization or vector embedding generation. In certain embodiments, one or more system parameters 188 may also include hyperparameters of underlying machine-learning models, such as learning rates, reward discount factors, or policy update frequencies, that govern how adaptively system 100 learns from new performance data. In an embodiment, at least a processor 108 may store updated system parameters within a configuration registry or parameter repository that is securely synchronized with each subsystem requiring the update. Prior to full deployment, the updated parameters may be validated using a simulation or staging environment that replays a subset of recent intake data under the new configuration. In an embodiment, at least a processor 108 may evaluate comparative metrics, such as average classification accuracy, confidence-score stability, and filtering precision, to confirm that the modified parameters produce statistically significant improvements relative to the prior configuration. In some embodiments, validation may include cross-validation testing against stratified segments of the performance dataset 182 to ensure that the adjustments generalize across different practice areas, input modalities, and inquiry types. In an embodiment, once validated, new system parameters may be versioned with a unique identifier, timestamp, and model lineage descriptor, allowing system 100 to maintain a complete audit trail of its adaptive evolution. In some embodiments, the parameter registry may use a semantic versioning structure (e.g., major.minor.patch) to denote incremental, structural, or emergency updates. Historical versions may be stored in a secure database or distributed ledger, enabling rollback to prior configurations if a subsequent update yields suboptimal behavior. In an embodiment, at least a processor 108 may further tag each parameter set with a deployment scope (e.g., global, node-specific, or module-specific) to control which subsystems adopt the change and when synchronization occurs.

Still referring to FIG. 1, in an embodiment, system 100 may employ a parameter synchronization service that propagates updates asynchronously across distributed computing nodes, ensuring minimal disruption to active intake processes. In an embodiment, each downstream module (e.g., classification layer 130, filtering layer 142, or correlation engine) may retrieve the latest approved parameter set through a lightweight API call at session initialization or scheduled update intervals. Integrity checks, such as checksum validation or digital signature verification, may confirm that the deployed parameters have not been corrupted or tampered with during transmission. Operational governance may be maintained through a parameter monitoring dashboard that visualizes system performance metrics before and after each update. In an embodiment, the dashboard may display time-series plots of accuracy, reward scores, or filtering latency, along with alerts that flag anomalous deviations following parameter changes. In some embodiments, administrators may approve or reject updates using a human-in-the-loop control interface, enabling selective acceptance of RL-driven recommendations. The monitoring subsystem may also log user approvals, validation results, and deployment timestamps for compliance with internal audit policies or external data governance regulations. Through this structured update, validation, and governance workflow, system 100 may ensure that adaptive learning remains stable, transparent, and controllable, allowing the reinforcement learning model 186 to enhance system performance dynamically while preserving reliability, traceability, and regulatory compliance.

Figure 2:
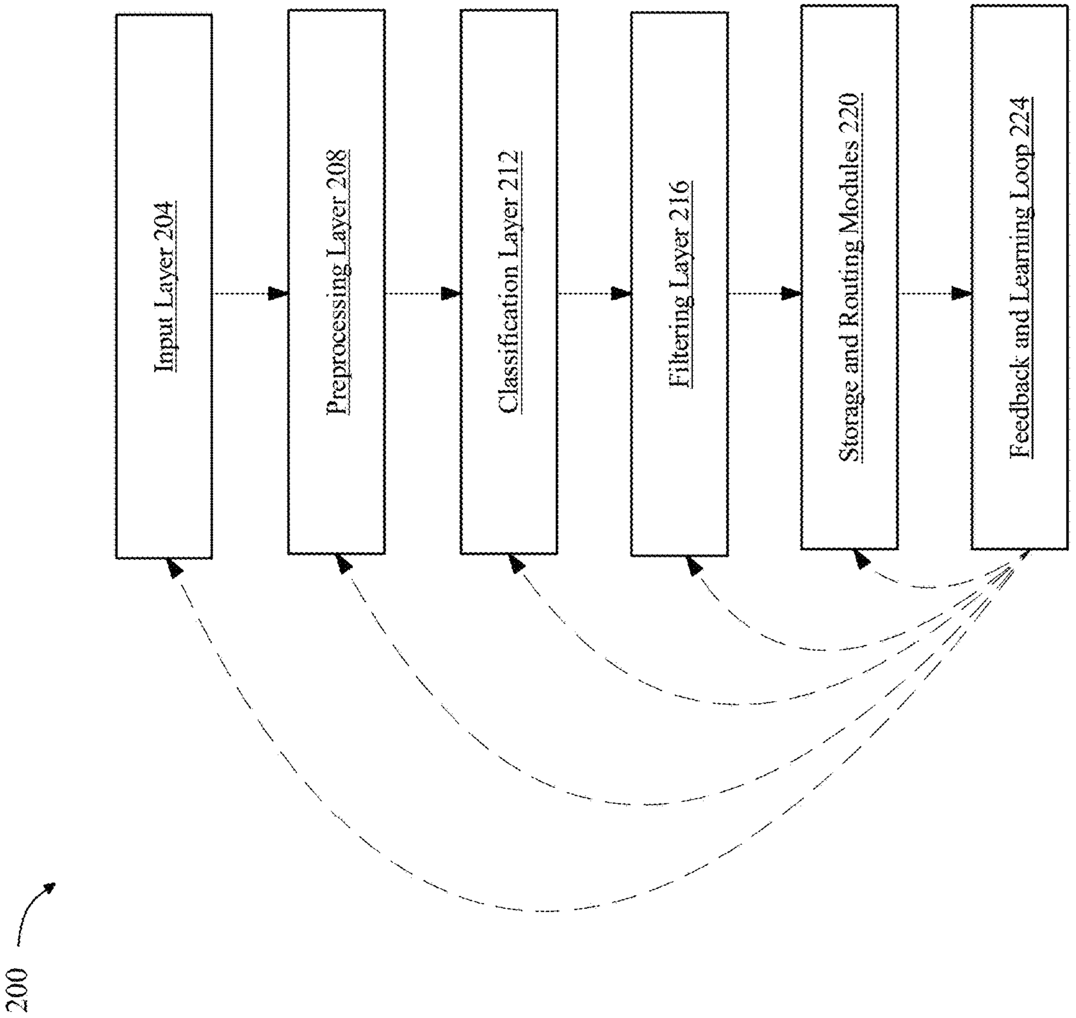
FIG. 2 illustrates an exemplary multi-modal intake processing pipeline.

Now referring to FIG. 2, illustrated is an exemplary multi-modal intake processing pipeline 200. In an embodiment, pipeline 200 may represent an exemplary data-flow architecture for transforming raw, unstructured inputs into classified, filtered, and stored inquiry objects. The pipeline 200 may include an input layer 204, a preprocessing layer 208, a classification layer 212, a filtering layer 216, a storage and routing modules 220, and a feedback and learning loop 224, arranged in sequential communication. In an embodiment, each layer may perform a distinct set of operations configured to progressively refine data received from one or more input data streams into a structured digital artifact usable by downstream systems. Solid arrows may indicate a primary, one-directional data flow through the pipeline, while dashed arrows may represent adaptive feedback paths enabling dynamic recalibration of system parameters based on reinforcement learning outputs.

In continued reference to FIG. 2, in an embodiment, input layer 204 may receive one or more input data streams including audio data streams, textual data streams, or combinations thereof. In an embodiment, audio data streams may include, without limitation, telephonic voice recordings, voicemail submissions, or live conversation data captured via microphone or cloud telephony infrastructure. Further, textual data streams may include, without limitation, electronic mail messages, live-chat transcripts, or structured and unstructured web form submissions. Each input data stream may be tagged with a source identifier to facilitate subsequent pairing and correlation within the detection layer as described elsewhere herein.

With further reference to FIG. 2, in an embodiment, preprocessing layer 208 may convert and normalize raw input into a form suitable for downstream processing. In certain embodiments, preprocessing may include automatic speech-recognition (ASR) model operations that convert audio signals into text-based representations, natural-language-processing routines that tokenize and normalize textual input, and schema-mapping logic that associates extracted data with predefined schema fields.

Still referring to FIG. 2, in an embodiment, classification layer 212 may apply one or more machine-learning classifiers to assign each inquiry object to at least one taxonomy node of a plurality of taxonomy nodes. This layer may generate confidence scores and weighted confidence scores, as discussed in further detail above, to quantify the likelihood that a given classification is correct.

With continued reference to FIG. 2, in an embodiment, filtering layer 216 may evaluate accumulated inquiry objects according to predefined rule sets and confidence thresholds, thereby generating a filtered set of inquiry objects. These objects may then be forwarded to storage and routing modules 220, which may store filtered objects in a structured database configured for secure synchronization with one or more external systems via an authenticated application-programming-interface (API) layer. The same storage and routing modules 220 may also encrypt outgoing data streams and route inquiry objects to external processing pipelines for subsequent operations such as case management, analytics, or archiving.

In further reference to FIG. 2, in an embodiment, feedback and learning loop 224 may receive outcome data and performance metrics from the external systems and generate parameter updates using a reinforcement-learning model. These updates may propagate back through dashed feedback paths to one or more upstream layers, such as the classification layer 212 and filtering layer 216, to adjust thresholds, weighting parameters, and decision logic. Through this feedback architecture, pipeline 200 may achieve continuous adaptation, progressively improving screening accuracy, routing precision, and overall system efficiency.

Still referring to FIG. 2, in an embodiment, the feedback and learning loop 224 may dynamically interact with one or more upstream layers of the pipeline 200, including at least the classification layer 212 and the filtering layer 216. Through the adaptive feedback paths depicted as dashed arrows, the at least a processor may transmit reinforcement-derived parameter updates that modify operational thresholds, weighting coefficients, and rule-set priorities within those layers. For example, following ingestion of outcome data from one or more external systems, the reinforcement learning model of the feedback and learning loop 224 may determine that a particular taxonomy node exhibits an elevated false-positive rate. In response, the processor may adjust the node-specific weighting parameters or elevate the confidence-score threshold associated with that node within classification layer 212. Similarly, when filtering layer 216 is found to exclude inquiries that later prove to be valid, the feedback loop 224 may lower the corresponding exclusion threshold or revise the predefined rule-set conditions to capture comparable future cases. In certain embodiments, parameter updates may be transmitted asynchronously to ensure uninterrupted operation of the primary data-processing pipeline. Each update may include a version identifier, timestamp, and validation checksum allowing the receiving modules to verify integrity and compatibility before adoption. Over successive iterations, these updates may yield measurable technical improvements, such as reduced model drift, faster convergence of classification decisions, and increased intake accuracy without human intervention. The bidirectional coupling shown in FIG. 2 therefore enables the system to continuously refine its performance in real time, embodying a closed-loop learning architecture that optimizes classification precision and filtering efficiency based on verified empirical outcomes.

Figure 3:
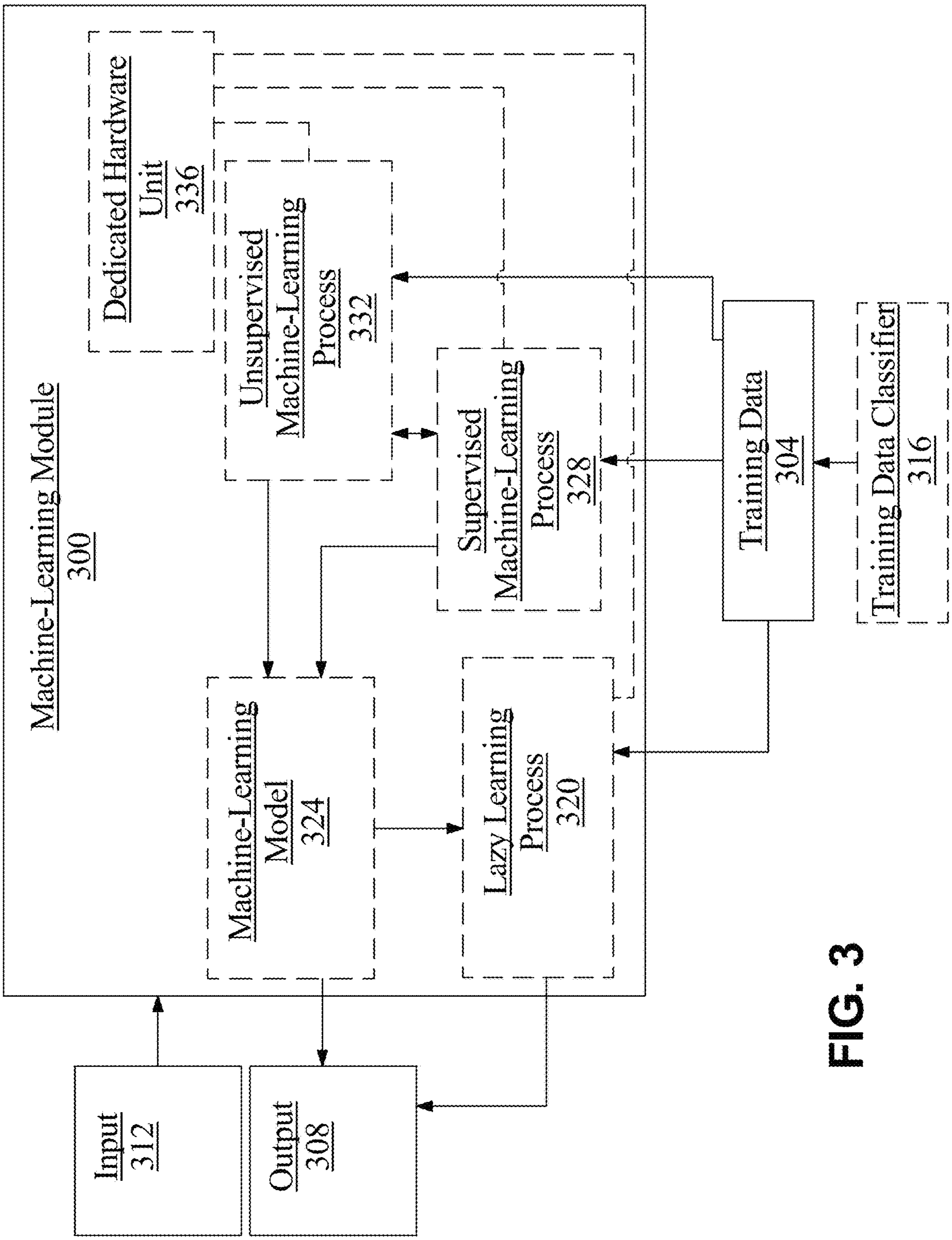
FIG. 3 is a diagram of an exemplary embodiment of a machine-learning module.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example training data 304 may include, as inputs, multi-modal intake artifacts such as audio transcriptions, textual inquiries, and web form submissions, each mapped to structured schema fields that include client demographic information, case-type descriptors, urgency indicators, and jurisdictional identifiers. Corresponding outputs may include classification labels designating the appropriate taxonomy node for each inquiry object, associated confidence scores, and routing decisions (e.g., "qualify," "disqualify," or "refer"). In certain embodiments, training data 304 may further associate these outputs with longitudinal outcome metrics, such as case acceptance rate, resolution duration, and client retention, allowing models trained on this data to learn predictive relationships between intake attributes and ultimate case performance. Such training datasets may therefore serve as the foundation for supervised or reinforcement learning models that refine classification thresholds, filtering logic, and adaptive weighting parameters across successive iterations of the intake pipeline.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to practice-area cohorts, jurisdictional clusters, or urgency-based subpopulations of inquiries corresponding to distinct taxonomy nodes within the intake system. For instance, the classifier may segment incoming inquiries into cohorts such as "personal-injury-high-value," "medical-malpractice-low-urgency," or "employment-law-multi-jurisdictional," each representing a sub-population of cases with shared structural or linguistic features in the intake data. In other embodiments, the classifier may group training examples according to communication modality (e.g., audio-derived vs. text-based inquiries), client-type indicators (e.g., individual vs. corporate clients), or historical outcome trends (e.g., inquiries with high retention probability vs. low engagement). By labeling and organizing the training data into such meaningful sub-populations, the classifier may enable downstream learning modules, including the reinforcement-learning model, to optimize model weightings, confidence thresholds, and filtering rules for each cohort independently, thereby improving specialization and predictive accuracy across the multi-modal intake pipeline.

Still referring to FIG. 3, a computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)=P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device may then calculate a likelihood table by calculating probabilities of different data entries and classification labels. A computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, a computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_1^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. A computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}:X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 3, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs as described above as inputs, outputs as described above as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Continuing to refer to FIG. 3, evaluation of error function and/or other comparison results may include comparison of each of error function and/or other comparison results to a maximum single error threshold; in other words, a criterion of evaluation may include performing iterative retraining if any single comparison and/or error function output exceeds maximum single error threshold or if a count of single comparison and/or error function outputs exceeding single error threshold exceeds a threshold number and/or proportion of overall error function and/or other comparison results. Alternatively or additionally, evaluation of error function and/or other comparison results may include comparison of an aggregated plurality of error function and/or other comparison results to an aggregate error threshold; in other words, a criterion of evaluation may include performing iterative retraining if a result of averaging or otherwise aggregating a plurality such as some or all evaluated function and/or other comparison results exceeds aggregate error threshold. Aggregation may be performed in any manner of aggregation described in this disclosure and/or any combination thereof. Criteria for evaluations may be evaluated separately such that failing any one criterion causes iterative retraining; alternatively or additionally evaluation results may be combined according to one or more logical or other rules.

As a non-limiting, illustrative example, and still referring to FIG. 3, where outputs to be compared by error function are numerical values, error function may include subtraction of one from the other to derive an absolute value and/or mean squared error. Where outputs and/or training examples are represented as a binary classification, an error function may include a hinge loss function, sigmoid cross entropy loss function, weighted cross entropy loss function, or the like. Where output and/or exemplary output in a training set is a classification to three or more values, error function may include a softmax cross entropy loss function, a sparse cross entropy loss function, a Kullback-Leibler divergence loss function, or the like. Where both retaining and training with include supervised training, retraining may use a different error function, different weight update functions and/or parameters, or the like than in the training stage. For instance, and without limitation, when a previous iterative retraining process included training using examples from until a first convergence threshold and/or epsilon value and/or neighborhood is met, a subsequent iterative retraining process may include a lower convergence threshold, a smaller value of epsilon, or the like. Iterative retraining may include using one or more examples that were not used in any previous training and/or retraining process; for instance, where convergence was initially and/or previously achieved using a first subset of examples a subsequent retraining process may use examples from a second subset of examples, which may be wholly disjoint from first subset and/or have one or more elements that are not found in first subset.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including, without limitation, support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic “1” and “0” voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
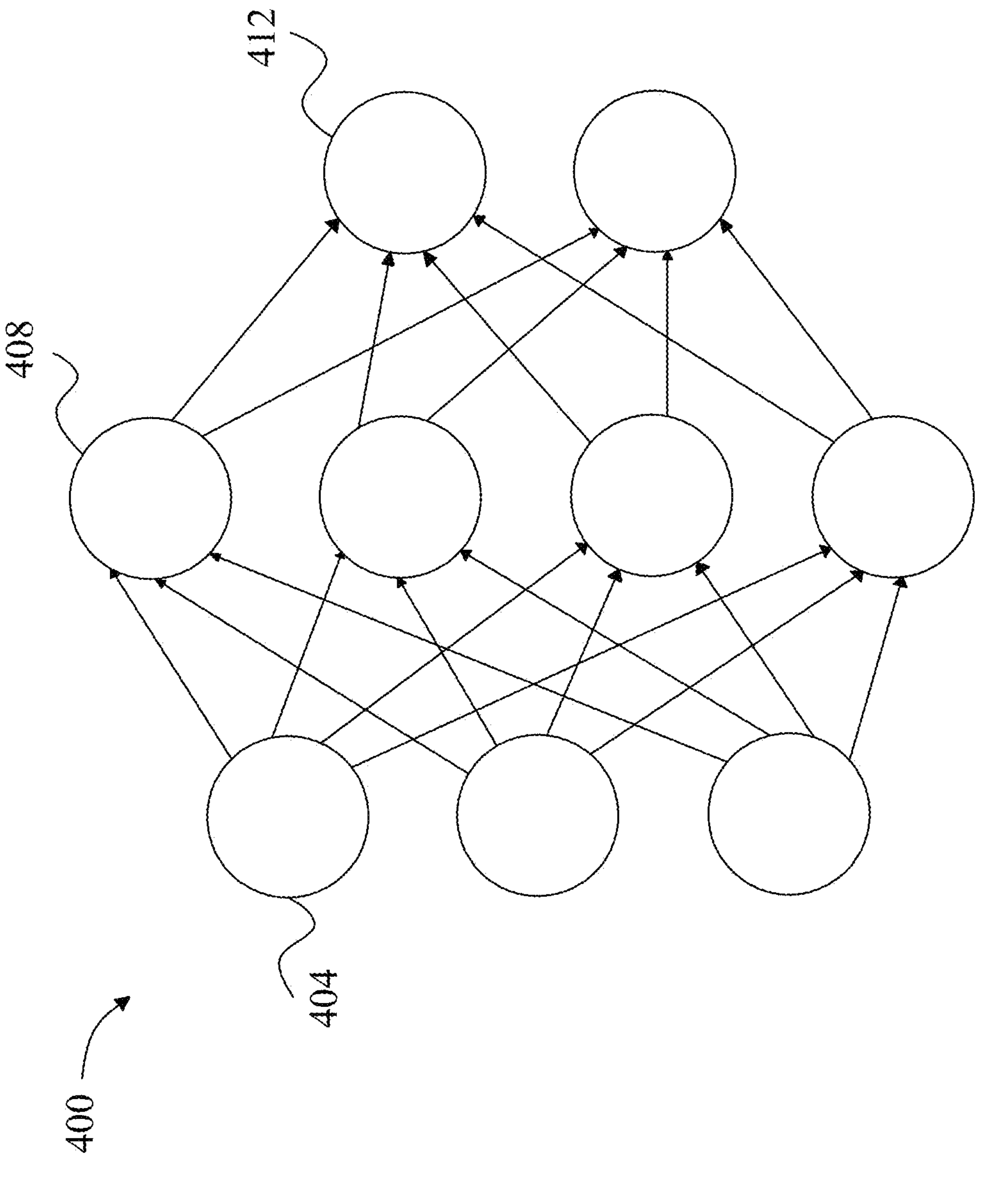
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
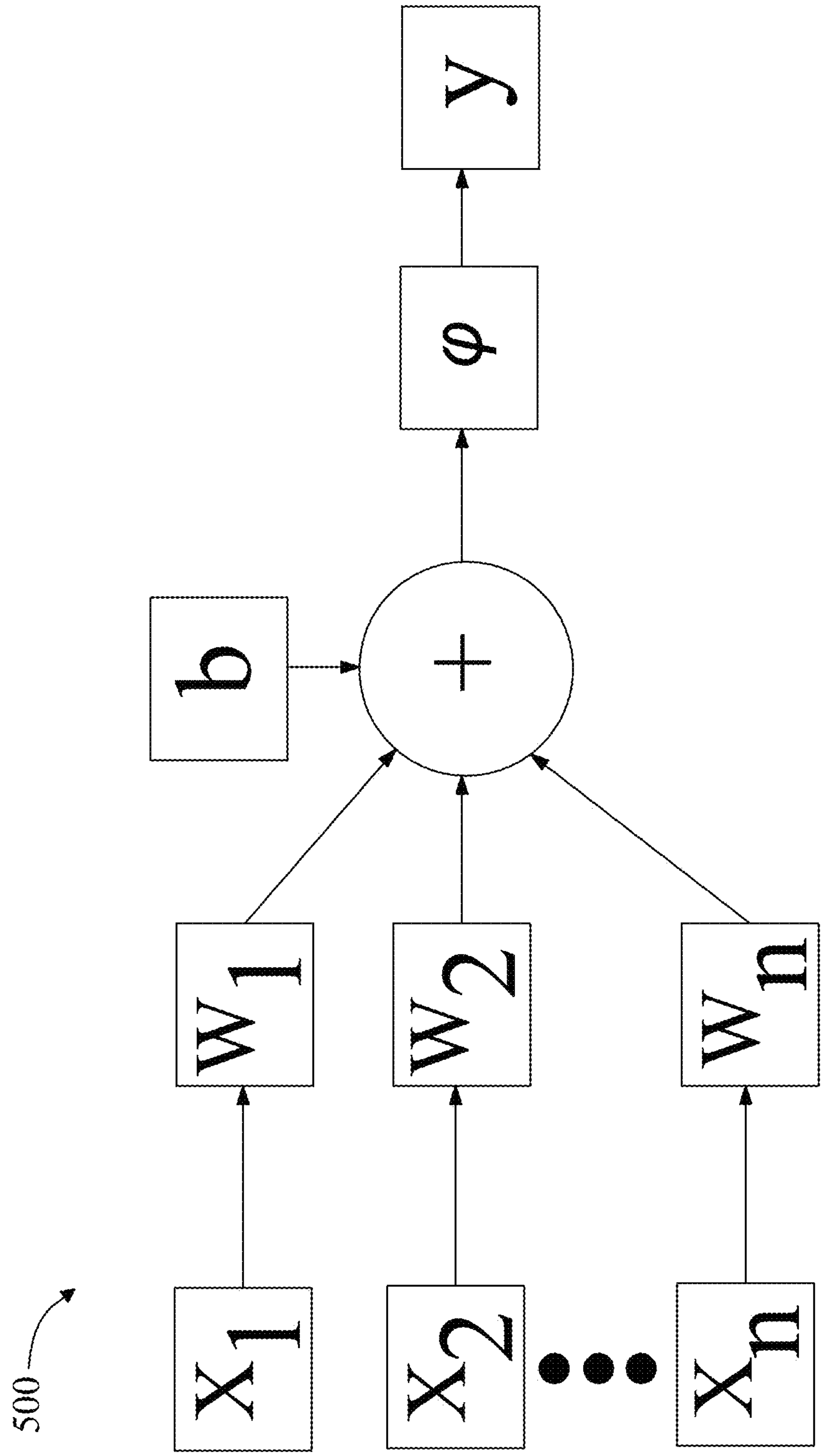
FIG. 5 is a diagram of an exemplary embodiment of a node of a neural network.

Referring now to FIG. 5, an exemplary embodiment of a node 500 of a neural network is illustrated. A node may include, without limitation, a plurality of inputs xi that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tan h (hyperbolic tangent) function, of the form $$\frac{e^x - e^{-x}}{e^x + e^{-x}},$$

a tan h derivative function such as f(x)=tan $h^2$(x), a rectified linear unit function such as f(x)=max(0,x), a "leaky" and/or "parametric" rectified linear unit function such as f(x)=max (ax,x) for some a, an exponential linear units function such as $$f(x) = \begin{cases} x \text{ for } x \geq 0 \\ \alpha(e^x - 1) \text{ for } x < 0 \end{cases}$$

for some value of a (this function may be replaced and/or weighted by its own derivative in some embodiments), a softmax function such as $$f(x_i) = \frac{e^x}{\sum_i x_i}$$

where the inputs to an instant layer are $x_i$, a swish function such as f(x)=x*sigmoid(x), a Gaussian error linear unit function such as $f(x)=a(1+\tan h(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$, or of other coefficients and/or parameters of an activation function, may be determined by training a neural network using training data, which may be performed using any suitable process as described above. Each weight in a neural network may, without limitation, be updated and/or tuned, based on an error function J, using a backpropagation updating method, such as:

$$w_{new} = w_{old} - \alpha\frac{dJ}{dw}$$

where $w_{new}$ is the updated weight value, $w_{old}$ is the previous weight value, α is a parameter to set the learning rate, and $$\frac{dJ}{dw}$$

is the partial derivative of with respect to weight w.

Figure 6:
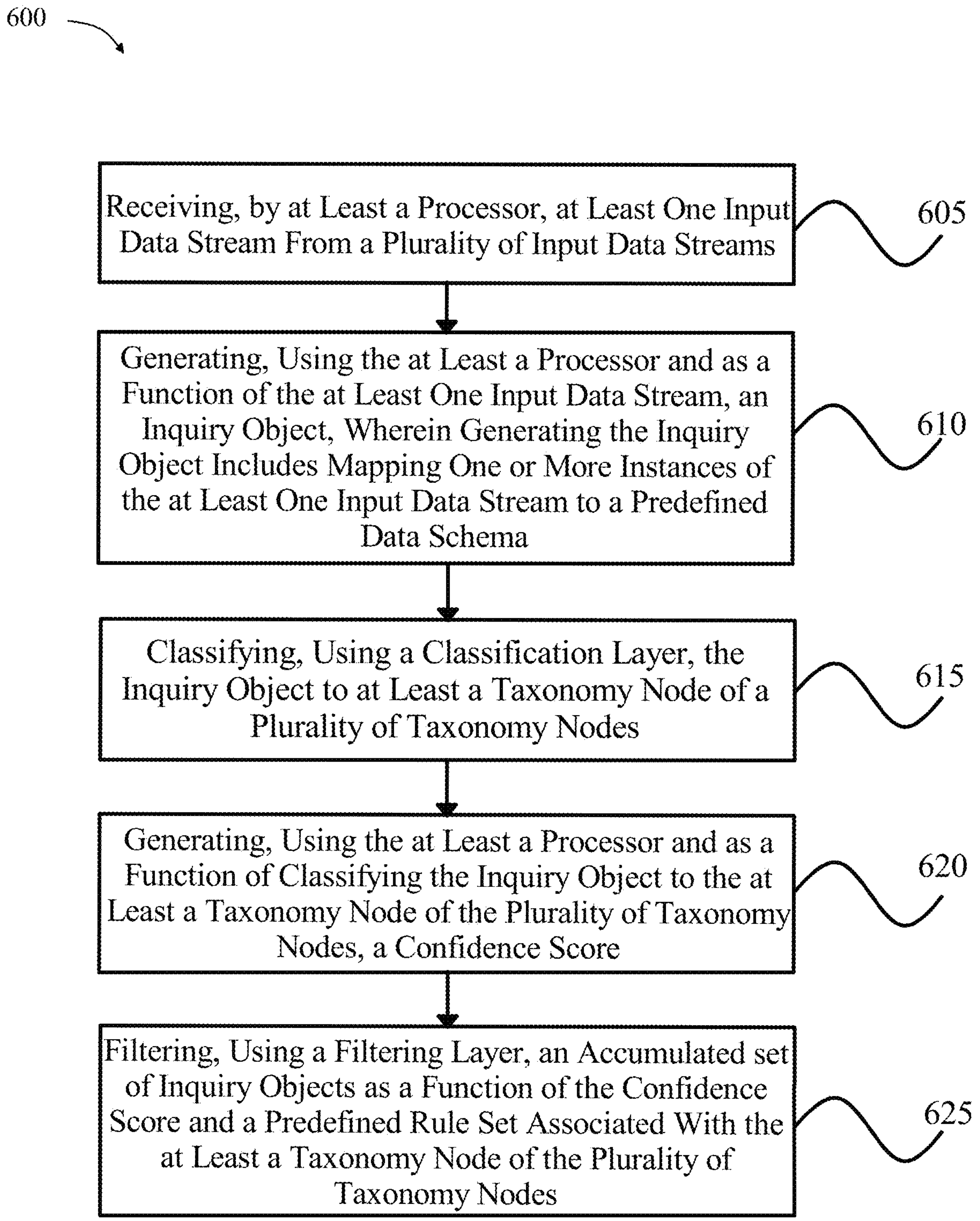
FIG. 6 is a flow diagram of an exemplary method of multi-modal intake processing and adaptive classification.

Referring now to FIG. 6, a flow diagram of an exemplary method 600 of multi-modal intake processing and adaptive classification is illustrated. Method 600 may include a step 605 of receiving, by at least a processor, at least one input data stream from a plurality of input data streams. In an embodiment, where the at least one input data stream includes an audio data stream generating the inquiry object may include converting the audio data stream into a text-based representation using an automatic speech-recognition (ASR) model. In an embodiment, each input data stream of the plurality of input data streams may include a source identifier. This may be implemented, without limitation, as referenced in FIGS. 1-5.

In continued reference to FIG. 1, method 600 may include a step 610 of generating, using the at least a processor and as a function of the at least one input data stream, an inquiry object, wherein generating the inquiry object may include mapping one or more instances of the at least one input data stream to a predefined data schema. In an embodiment, generating the inquiry object may include pairing two or more input data streams as a function of the source identifier and combining, as a function of paring the two or more input data streams, the one or more instances of the two or more input data streams into a single inquiry object. This may be implemented, without limitation, as referenced in FIGS. 1-5.

With further reference to FIG. 6, method 600 may include a step 615 of classifying, using a classification layer, the inquiry object to at least a taxonomy node of a plurality of taxonomy nodes. In an embodiment, method 600 may further include determining, using the at least a processor, for each taxonomy node of the plurality of taxonomy nodes, one or more node-specific weighting parameters and generating, using the at least a processor, for the inquiry object, a weighted confidence score as a function of the confidence score and the node-specific weighting parameters. This may be implemented, without limitation, as referenced in FIGS. 1-5.

Still referring to FIG. 6, method 600 may include a step 620 of generating, using the at least a processor and as a function of classifying the inquiry object to the at least a taxonomy node of the plurality of taxonomy nodes, a confidence score, wherein the confidence score is appended to the inquiry object as an instance. This may be implemented, without limitation, as referenced in FIGS. 1-5.

In further reference to FIG. 6, method 600 may include a step 625 of filtering, using a filtering layer, an accumulated set of inquiry objects as a function of the confidence score and a predefined rule set associated with the at least a taxonomy node of the plurality of taxonomy nodes. This may be implemented, without limitation, as referenced in FIGS. 1-5.

With continued reference to FIG. 6, method 600 may include storing, in a structured database configured for secure synchronization with one or more external systems, a filtered set of inquiry objects as a function of filtering the accumulated set of inquiry objects. This may be implemented, without limitation, as referenced in FIGS. 1-5.

Still referring to FIG. 6, method 600 may include routing, using the at least a processor, a filtered set of inquiry objects to an external processing pipeline. This may be implemented, without limitation, as referenced in FIGS. 1-5.

In continued reference to FIG. 6, method 600 may include generating, using the at least a processor, a supplemental information request as a function of filtering the accumulated set of inquiry objects, wherein generating the supplemental information request includes: identifying one or more inquiry objects within the accumulated set of inquiry objects that fail to satisfy a filtering condition, determining, for each inquiry object of the one or more inquiry objects, at least one non-compliant data field, selecting, as a function of the at least a taxonomy node of the plurality of taxonomy nodes and the at least one non-compliant data field, one or more data-attribute prompts, and transmitting, using a communication interface, the one or more data-attribute prompts to a source of the at least one input data stream. This may be implemented, without limitation, as referenced in FIGS. 1-5.

With further reference to FIG. 6, method 600 may include monitoring, using a detection layer, the plurality of input data streams for a source identifier associated with the inquiry object and modifying, using the at least a processor, the inquiry object as a function of detecting the source identifier in at least one input data stream of the plurality of input data streams. This may be implemented, without limitation, as referenced in FIGS. 1-5.

Still referring to FIG. 6, method 600 may include synchronizing, using the at least a processor and an authenticated application programming interface (API) layer, the filtered set of inquiry objects with one or more external systems and encrypting, using the at least a processor, the filtered set of inquiry objects transmitted through the authenticated API layer using an encryption protocol. This may be implemented, without limitation, as referenced in FIGS. 1-5.

In further reference to FIG. 6, method 600 may include receiving, by the at least a processor and from one or more external systems, outcome data associated with the inquiry object, generating, using the at least a processor, a performance dataset as a function of the outcome data and inquiry object generation metadata, and updating, using a reinforcement learning model, one or more system parameters as a function of the performance dataset. This may be implemented, without limitation, as referenced in FIGS. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
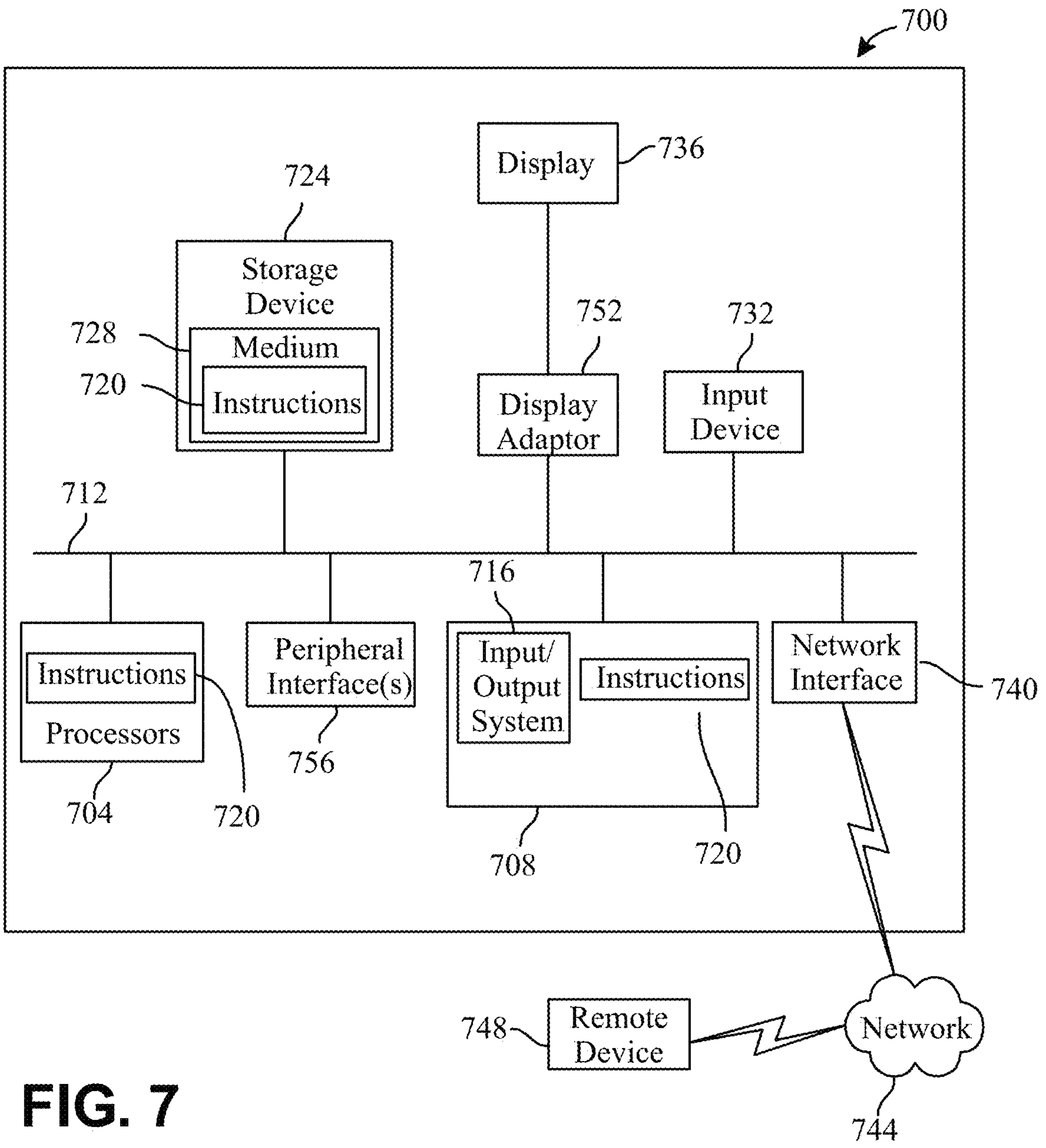
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC). Each processor and/or processor core may perform a state transition, instruction, and/or instruction step during a period of a "clock," or a regular oscillator that generates periodic output waveform, such as a square wave, having a regular period; different processors and/or cores may have distinct clocks. A processor may operate as and/or include a processing unit that performs instruction inputs, arithmetic operations, logical operations, memory retrieval operations, memory allocation operations, and/or input and output operations; a control circuit or module within a processor may determine which of the above-described functions a processor and/or unit within a processor will perform on a given clock cycle. A processor may include a plurality of processing units or "cores," each of which performs the above-described actions; multiple cores may work on disparate instruction sets and/or may work in parallel. A single core may also include multiple arithmetic, logic, or other units that can work in parallel with each other. Parallel computing between and/or within processors and/or cores may include multithreading processes and/or protocols such as without limitation Tomasulo's algorithm. As used in this disclosure, "a processor," and/or "configuring a processor," is equivalent for the purposes of this disclosure to at least a processor, a plurality of processors, and/or a plurality of processor cores, and/or programming at least a processor, a plurality of processors, and/or a plurality of processor cores, which may be configured to operate on instructions in parallel and/or sequentially according to multithreading algorithms, parallel computing, load and/or task balancing, and/or virtualization, for instance and without limitation as described below.

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof. Memory 708 may include a primary memory and a secondary memory. "Primary memory," which may be implemented, without limitation as "random access memory" (RAM), is memory used for temporarily storing data for active use by a processor. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In some embodiments, storage device 724 and/or devices "Secondary memory" also known as "storage," "hard disk drive" and the like for the purposes of this disclosure is a long-term storage device in which an operating system and other information is stored; operating system and/or main program instructions may alternatively or additionally be stored in hard-coded memory ROM, or the like. In one or remote embodiments, information may be retrieved from secondary memory and copied to primary memory during use. In one or more embodiments, secondary memory may be referred to as non-volatile memory wherein information is preserved even during a loss of power. In some embodiments, data from secondary memory is transferred to primary memory before being accessed by a processor. In one or more embodiments, data is transferred from secondary to primary memory wherein circuitry may access the information from primary memory. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display 736. Examples of a display device include, but are not limited to, a liquid crystal display (LCD), a cathode ray tube (CRT), a plasma display, a light emitting diode (LED) display, and any combinations thereof. Display adapter 752 and display 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

Further referring to FIG. 7, a computing device may include any computing device as described in this disclosure, including without limitation a microcontroller, microprocessor, digital signal processor (DSP) and/or system on a chip (SoC) as described in this disclosure. A computing device may include, be included in, and/or communicate with a mobile device such as a mobile telephone or smartphone. A computing device may include a single device having components as described above operating independently, or may include two or more such devices and/or components thereof operating in concert, in parallel, sequentially or the like; two or more devices, processors, memory elements, and the like may be included together in a single computing device or in two or more computing devices. A computing device may interface or communicate with one or more additional devices as described below in further detail via a network interface device.

In some embodiments, and still referring to FIG. 7, a computing device may be a component of a combination of at least a computing device; at least a computing device may include, as a non-limiting example, a first computing device or cluster of computing devices in a first location and a second computing device or cluster of computing devices in a second location. At least a computing device may include one or more computing devices dedicated to data storage, security, distribution of traffic for load balancing, and the like. At least a computing device may distribute one or more computing tasks as described below across a plurality of computing devices of computing device, which may operate in parallel, in series, redundantly, or in any other manner used for distribution of tasks or memory between computing devices. At least a computing device may be implemented, as a non-limiting example, using a "shared nothing" architecture.

With continued reference to FIG. 7, one or more programs or software instructions may include a principal program and/or operating system; principal program and/or operating system may be a program that runs automatically upon startup of a computing device and manages computer hardware and software resources. Principal program and/or operating system may include "startup," "loop," and/or "main" programs on a microcontroller; such programs may initialize hardware resources and subsequently iterate through a series of instructions to make function calls, read in data at input ports, output data at output ports, and process interrupts caused by asynchronous data inputs or the like. Principal program and/or operating system may include, without limitation, an operating system, which may schedule program tasks to be implemented by one or more processors, act as an intermediary between one or more programs and inputs, outputs, hardware and/or memory. Examples of operating systems include without limitation Unix, Linux, Microsoft Windows, Android, Disc Operating System (DOS) and the like. Operating systems may include, without limitation, multi-computer operating systems that run across multiple computing devices, real-time operating systems, and hypervisors. A "hypervisor," as used in this disclosure, is an operating system that runs a virtual machine and/or container, where virtual machines and/or containers create virtual interfaces for programs that mimic the behavior of hardware elements such as processors and/or memory; interactions with such virtual interfaces appear, to programs executed on virtual machines, to function as interactions with physical hardware, while in reality the hypervisor and/or programs such as containers (1) receive inputs from programs to the virtual resources and allocate such inputs to physical hardware that is not directly accessible to the programs, and (2) receive outputs from physical hardware and transmit such outputs to the programs in the form of apparent outputs from the virtual hardware. In some cases, one or more of computing system 700, processor 704, and memory 708 may be virtualized; that is, a virtual machine and/or container may interact directly with such computing system 700, processor 704, and/or memory 708, while managing communications therefrom and thereto via a virtual interface with programs. Computer virtualization may include dividing, or augmenting computing resources into a virtual machine, operating system, processor, and/or container. Virtualization of computer resources may be implemented through use of (1) multiple components, or portions thereof, working in concert, as if they were one unified (virtual) component; and/or (2) a portion of one or more components working as though it were a complete (virtual) component. For instance, where processor 704 comprises a plurality of processors and/or processor cores, virtualization may, in some cases, simulate or emulate a single (virtual) processor whose functions are allocated to one or more of the plurality of processors and/or processor cores. In this case, while processor 704 may be said to be virtualized, the processor 704, nevertheless, comprises actual hardware processor(s) or portion(s) thereof. Accordingly, in this disclosure, where a processor is said to perform instructions, such processor may comprise a virtualized processor, comprising a plurality or portion of hardware processors. Likewise, in this disclosure, where a memory is said to contain (i.e., store) instructions, such memory may comprise a virtualized memory, comprising a plurality or portion of memories. Technologies that enable such virtualization include (1) QEMU, www.qemu.org; (2) VMware by Broadcom Inc of Palo Alto, California; (3) VirtualBox by Oracle Corporation headquartered in Austin, Texas; and (4) kernel-based virtual machine (KVM) www.linux-kvm.org.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for multi-modal intake processing and adaptive classification, the system comprising:
- at least a processor; and
- a memory communicatively connected to the at least a processor, wherein the memory contains instructions configuring the at least a processor to:
  - receive at least one input data stream from a plurality of input data streams;
  - generate, as a function of the at least one input data stream, an inquiry object, wherein generating the inquiry object comprises mapping one or more instances of the at least one input data stream to a predefined data schema;
  - classify, using a classification layer, the inquiry object to at least a taxonomy node of a plurality of taxonomy nodes, wherein classifying the inquiry object comprises: performing feature extraction on the inquiry object to generate a feature vector; and computing a similarity measure between the feature vector and one or more taxonomy node vectors to identify the at least a taxonomy node;
  - generate, as a function of classifying the inquiry object to the at least a taxonomy node of the plurality of taxonomy nodes, a confidence score, wherein the confidence score is appended to the inquiry object as an instance;
  - generate a supplemental information request as a function of filtering the accumulated set of inquiry objects, wherein generating the supplemental information request comprises:
    - identifying one or more inquiry objects within the accumulated set of inquiry objects that fail to satisfy a filtering condition;
    - determining, for each inquiry object of the one or more inquiry objects, at least one non-compliant data field;
    - selecting, as a function of the at least a taxonomy node of the plurality of taxonomy nodes and the at least one non-compliant data field, one or more data-attribute prompts; and
    - transmitting, using a communication interface, the one or more data-attribute prompts to a source of the at least one input data stream; and
  - filter, using a filtering layer, an accumulated set of inquiry objects as a function of the confidence score and a predefined rule set associated with the at least a taxonomy node of the plurality of taxonomy nodes.

2. The system of claim 1, wherein:
- the at least one input data stream comprises an audio data stream; and
- generating the inquiry object comprises converting the audio data stream into a text-based representation using an automatic speech-recognition (ASR) model.

3. The system of claim 1, wherein:
- each input data stream of the plurality of input data streams comprises a source identifier; and
- generating the inquiry object comprises:
  - pairing two or more input data streams as a function of the source identifier; and
  - combining, as a function of pairing the two or more input data streams, the one or more instances of the two or more input data streams into a single inquiry object.

4. The system of claim 1, wherein the at least a processor is further configured to:
- determine for each taxonomy node of the plurality of taxonomy nodes, one or more node-specific weighting parameters; and
- generate, for the inquiry object, a weighted confidence score as a function of the confidence score and the node-specific weighting parameters.

5. The system of claim 1, wherein the at least a processor is further configured to store, in a structured database configured for secure synchronization with one or more external systems, a filtered set of inquiry objects as a function of filtering the accumulated set of inquiry objects.

6. The system of claim 1, wherein the at least a processor is further configured to route a filtered set of inquiry objects to an external processing pipeline.

7. The system of claim 1, wherein the at least a processor is further configured to:
- monitor, using a detection layer, the plurality of input data streams for a source identifier associated with the inquiry object; and
- modify the inquiry object as a function of detecting the source identifier in at least one input data stream of the plurality of input data streams.

8. The system of claim 1, wherein the at least a processor is further configured to:

synchronize, using an authenticated application programming interface (API) layer, the filtered set of inquiry objects with one or more external systems; and encrypt the filtered set of inquiry objects transmitted through the authenticated API layer using an encryption protocol.

9. The system of claim 1, wherein the at least a processor is further configured to:

receive, from one or more external systems, outcome data associated with the inquiry object;

generate a performance dataset as a function of the outcome data and inquiry object generation metadata; and update, using a reinforcement learning model, one or more system parameters as a function of the performance dataset.

10. A method of multi-modal intake processing and adaptive classification, the method comprising:

receiving, by at least a processor, at least one input data stream from a plurality of input data streams;

generating, using the at least a processor and as a function of the at least one input data stream, an inquiry object, wherein generating the inquiry object comprises mapping one or more instances of the at least one input data stream to a predefined data schema;

classifying, using the at least a processor and a classification layer, the inquiry object to at least a taxonomy node of a plurality of taxonomy nodes;

generating, using the at least a processor and as a function of classifying the inquiry object to the at least a taxonomy node of the plurality of taxonomy nodes, a confidence score, wherein the confidence score is appended to the inquiry object as an instance;

generating, using the at least a processor, a supplemental information request as a function of filtering am accumulated set of inquiry objects, wherein generating the supplemental information request comprises:

identifying one or more inquiry objects within the accumulated set of inquiry objects that fail to satisfy a filtering condition;

determining, for each inquiry object of the one or more inquiry objects, at least one non-compliant data field;

selecting, as a function of the at least a taxonomy node of the plurality of taxonomy nodes and the at least one non-compliant data field, one or more data-attribute prompts; and transmitting, using a communication interface, the one or more data-attribute prompts to a source of the at least one input data stream; and filtering, using the at least a processor and a filtering layer, an accumulated set of inquiry objects as a function of the confidence score and a predefined rule set associated with the at least a taxonomy node of the plurality of taxonomy nodes.

11. The method of claim 10, wherein:

the at least one input data stream comprises an audio data stream; and generating the inquiry object comprises converting the audio data stream into a text-based representation using an automatic speech-recognition (ASR) model.

12. The method of claim 10, wherein:

each input data stream of the plurality of input data streams comprises a source identifier; and generating the inquiry object comprises:

pairing two or more input data streams as a function of the source identifier; and combining, as a function of pairing the two or more input data streams, the one or more instances of the two or more input data streams into a single inquiry object.

13. The method of claim 10, further comprising:

determining, using the at least a processor, for each taxonomy node of the plurality of taxonomy nodes, one or more node-specific weighting parameters; and generating, using the at least a processor, for the inquiry object, a weighted confidence score as a function of the confidence score and the node-specific weighting parameters.

14. The method of claim 10, further comprising storing, in a structured database configured for secure synchronization with one or more external systems, a filtered set of inquiry objects as a function of filtering the accumulated set of inquiry objects.

15. The method of claim 10, further comprising routing, using the at least a processor, a filtered set of inquiry objects to an external processing pipeline.

16. The method of claim 10, further comprising:

monitoring, using a detection layer, the plurality of input data streams for a source identifier associated with the inquiry object; and modifying, using the at least a processor, the inquiry object as a function of detecting the source identifier in at least one input data stream of the plurality of input data streams.

17. The method of claim 10, further comprising:

synchronizing, using the at least a processor and an authenticated application programming interface (API) layer, the filtered set of inquiry objects with one or more external systems; and encrypting, using the at least a processor, the filtered set of inquiry objects transmitted through the authenticated API layer using an encryption protocol.

18. The method of claim 10, further comprising:

receiving, by the at least a processor and from one or more external systems, outcome data associated with the inquiry object;

generating, using the at least a processor, a performance dataset as a function of the outcome data and inquiry object generation metadata; and updating, using a reinforcement learning model, one or more system parameters as a function of the performance dataset.

* * * * *